US010045361B2

(12) United States Patent
Ma

(10) Patent No.: US 10,045,361 B2
(45) Date of Patent: Aug. 7, 2018

(54) METHOD, APPARATUS, AND SYSTEM FOR ESTABLISHING COOPERATIVE COMMUNICATION

(71) Applicant: Huawei Technologies Co., Ltd., Shenzhen, Guangdong (CN)

(72) Inventor: Jie Ma, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 84 days.

(21) Appl. No.: 15/192,572

(22) Filed: Jun. 24, 2016

(65) Prior Publication Data
US 2016/0309488 A1 Oct. 20, 2016

Related U.S. Application Data

(63) Continuation of application No. PCT/CN2013/090502, filed on Dec. 26, 2013.

(51) Int. Cl.
*H04W 72/08* (2009.01)
*H04W 72/04* (2009.01)
(Continued)

(52) U.S. Cl.
CPC ......... *H04W 72/085* (2013.01); *H04W 8/005* (2013.01); *H04W 48/10* (2013.01);
(Continued)

(58) Field of Classification Search
None
See application file for complete search history.

(56) References Cited

U.S. PATENT DOCUMENTS

2012/0127888 A1* 5/2012 Fujishima ........... H04W 72/085
370/252
2012/0127918 A1* 5/2012 Choi .................... H04L 5/0035
370/315
(Continued)

FOREIGN PATENT DOCUMENTS

CN 101854233 A 10/2010
CN 102811497 12/2012
(Continued)

OTHER PUBLICATIONS

"Discussion on Discovery for D2D Proximity Services", ETRI, 3GPP TSG-RAN WG2 Meeting #83, Aug. 19-23, 2013, 3 pages, R2-132589.
(Continued)

*Primary Examiner* — Robert C. Scheibel

(57) ABSTRACT

A specific solution is: An idle ready-to-support terminal receives a system broadcast sent by a base station, acquires a channel quality parameter between the ready-to-support terminal and the base station according to the system broadcast, and if a first threshold is met, acquires a channel quality parameter between the benefited terminal and the ready-to-support terminal; and if a second threshold is met, the ready-to-support terminal generates a measurement event, and sends the measurement event to the base station, so that the base station sends a supporting-cooperation indication to the ready-to-support terminal according to the measurement event, and the terminal establishes a cooperative communication set with the benefited terminal according to the supporting-cooperation indication. The present invention is used to establish a cooperative communication between a base station and a terminal.

18 Claims, 7 Drawing Sheets

(51) Int. Cl.
  *H04W 48/10*  (2009.01)
  *H04W 52/02*  (2009.01)
  *H04W 72/00*  (2009.01)
  *H04W 8/00*   (2009.01)
  *H04W 48/12*  (2009.01)

(52) U.S. Cl.
  CPC ..... *H04W 52/0229* (2013.01); *H04W 72/005* (2013.01); *H04W 72/048* (2013.01); *H04W 72/0466* (2013.01); *H04W 48/12* (2013.01); *Y02D 70/00* (2018.01); *Y02D 70/1262* (2018.01); *Y02D 70/21* (2018.01)

(56) References Cited

U.S. PATENT DOCUMENTS

| | | | | |
|---|---|---|---|---|
| 2012/0157139 | A1* | 6/2012 | Noh | H04W 72/0406 455/501 |
| 2012/0250545 | A1* | 10/2012 | Papadogiannis | H04W 88/04 370/252 |
| 2012/0300666 | A1* | 11/2012 | Jang | H04B 7/026 370/252 |
| 2013/0003573 | A1* | 1/2013 | Reznik | H04W 16/14 370/252 |
| 2013/0135988 | A1* | 5/2013 | Kim | H04L 1/1819 370/216 |
| 2014/0171062 | A1* | 6/2014 | Fallgren | H04W 40/22 455/422.1 |
| 2014/0313897 | A1* | 10/2014 | Oh | H04B 7/024 370/235 |
| 2015/0031406 | A1* | 1/2015 | Fouad | H04W 16/10 455/509 |
| 2016/0212682 | A1* | 7/2016 | Chung | H04W 12/06 |
| 2016/0242065 | A1* | 8/2016 | Fukuta | H04W 72/04 |
| 2017/0273121 | A1* | 9/2017 | Tong | H04W 16/26 |

FOREIGN PATENT DOCUMENTS

| | | |
|---|---|---|
| CN | 103188706 | 7/2013 |
| CN | 103209427 A | 7/2013 |

OTHER PUBLICATIONS

"RAN2 considerations for Proximity Discovery", Huawei, HiSilicon, 3GPP TSG RAN WG2 Meeting #83 bis, 8 pages, R2-133511.

"Considerations on D2D Discovery Resource Allocation", CATT, 3GPP TSG RAN WG2 Meeting #84, Oct. 11-15, 2013, 4 pages, R2-134062.

"On resource allocation for D2D discovery", ZTE Corporation, 3GPP TSG-RAN WG2 Meeting #84, Nov. 11-15, 2013, 5 pages, R2-134212.

"3rd Generation Partnership Project; Technical Specification Group Services and System Aspects; Study on architecture enhancements to support Proximity-based Services (ProSe)(Release 12)", 3GPP TR 23.703 V1.0.0, Dec. 5, 2013, 275 pages.

* cited by examiner

METHOD, APPARATUS, AND SYSTEM FOR ESTABLISHING COOPERATIVE COMMUNICATION

CROSS-REFERENCE TO RELATED APPLICATIONS

This application is a continuation of International Application No. PCT/CN2013/090502, filed on Dec. 26, 2013, which is hereby incorporated by reference in its entirety

TECHNICAL FIELD

The present invention relates to the communications field, and in particular, to a method, an apparatus, and a system for establishing cooperative communication.

BACKGROUND

Multiple user cooperative communication (MUCC) is a technology that increases, in an LTE system, a system throughput of particular UE by means of cooperation between multiple user equipments (UE). Specifically, for two cooperative UEs, one is referred to as supporting user equipment (S-UE), which is used as a data relay for B-UE, and the other is referred to as benefited user equipment (B-UE), which is UE at a data source end or a user that actually receives and uses data.

The B-UE cannot enjoy a good service at a place where cellular coverage is poor. In this case, if at least one UE close to the B-UE can communicate with a base station, and the B-UE can also transmit data to the at least one UE, in this case, the at least one UE may be selected as the S-UE, to relay data for the B-UE. The S-UE needs to be selected from UEs that are in an idle (idle) state, that have a discovery function, and for which signal sending is enabled. The UE in the idle state sends a device discovery identifier of the UE to the B-UE, so that the B-UE obtains discovery information, so that the B-UE can select an S-UE. An evolved base station (eNB) searches a UE list in the discovery information reported by the B-UE to obtain the UEs in the idle state. The eNB acquires, from the list in the discovery information reported by the B-UE, UEs that are in the idle state and that have a support function, so that the eNB switches, by means of a paging process, these UEs that have the support function from the idle state to a connect (connect) state. In this way, the eNB may obtain channel quality of these idle UEs by means of measurement, thereby determining whether these idle UEs can become an S-UE.

In a process of establishing the foregoing cooperative communication, the eNB needs to be connected to all UEs that are in the idle state and that have the support function. In this way, the UEs are switched from the idle state to the connected state, and the UEs and the base station further need to perform measurement for configuration of an air interface link and measurement reporting. Therefore, the UEs need to consume a large amount of electricity.

SUMMARY

Embodiments of the present invention provide a method, an apparatus, and a system for establishing cooperative communication, which can avoid that all terminals that have a support function and that are in an idle state establish connections to a base station, resolving a problem that a terminal consumes a large quantity of electricity.

To achieve the foregoing objective, the following technical solutions are used in the embodiments of the present invention:

According to a first aspect, a method for establishing cooperative communication is provided, and is applied to a ready-to-support terminal, where the ready-to-support terminal is in an idle state, and the method includes:

receiving a system broadcast sent by a base station;

acquiring a channel quality parameter between the supporting terminal and the base station according to the system broadcast;

when the channel quality parameter between the ready-to-support terminal and the base station meets a first threshold, acquiring a channel quality parameter between the benefited terminal and the ready-to-support terminal;

when the channel quality parameter between the ready-to-support terminal and the benefited terminal meets a second threshold, generating, by the ready-to-support terminal, a measurement event, and sending the measurement event to the base station, so that the base station sends a supporting-cooperation indication to the ready-to-support terminal according to the measurement event; and receiving the supporting-cooperation indication sent by the base station, and establishing a cooperative communication set with the benefited terminal according to the supporting-cooperation indication.

With reference to the first aspect, in a first possible implementation manner, when the channel quality parameter between the ready-to-support terminal and the base station meets the first threshold, the method further includes:

receiving, by the ready-to-support terminal, a beacon signal sent by the benefited terminal; and the acquiring a channel quality parameter between the benefited terminal and the ready-to-support terminal specifically includes:

acquiring the channel quality parameter between the benefited terminal and the ready-to-support terminal by using the beacon signal.

With reference to the first aspect or the first possible implementation manner of the first aspect, in a second possible implementation manner, the measurement event includes: an identity ID of the measurement event, content of the measurement event, the channel quality parameter between the ready-to-support terminal and the base station, the channel quality parameter between the ready-to-support terminal and the benefited terminal, and an identifier of the benefited terminal.

With reference to the second possible implementation manner of the first aspect, in a third possible implementation manner, the content of the measurement event includes:

the channel quality parameter between the ready-to-support terminal and the base station meets the first threshold; and the channel quality parameter between the ready-to-support terminal and the benefited terminal meets the second threshold.

According to a second aspect, a method for establishing cooperative communication is provided, where the method is applied to a base station, and includes:

sending, by the base station, a system broadcast to an idle ready-to-support terminal, so that the idle ready-to-support terminal serves as a ready-to-support terminal according to the system broadcast, and acquires a channel quality parameter between the ready-to-support terminal and the base station;

receiving, by the base station, a measurement event sent by the ready-to-support terminal device;

sending, by the base station, a supporting-cooperation indication to the ready-to-support terminal according to the measurement event, where the supporting-cooperation indication is used to notify the ready-to-support terminal to establish a cooperative communication set with the benefited terminal; and sending, by the base station, a benefited-cooperation indication to the benefited terminal according to the measurement event, where the benefited-cooperation indication is used to notify the benefited terminal to establish a cooperative communication set with the ready-to-support terminal.

With reference to the second aspect, in a first possible implementation manner, before the sending, by the base station, a system broadcast to an idle ready-to-support terminal, the method further includes:

performing, by the base station, transmission rate detection on all terminals, and selecting a benefited terminal from all the terminals according to a detection result; and sending a beacon signal information table to the benefited terminal, so that the benefited terminal selects a beacon signal from the beacon signal information table, and sends the beacon signal to the ready-to-support terminal.

With reference to the second aspect or the first possible implementation manner of the second aspect, in a second possible implementation manner, the measurement event includes: an identity ID of the measurement event, content of the measurement event, the channel quality parameter between the ready-to-support terminal and the base station, a channel quality parameter between the ready-to-support terminal and the benefited terminal, and an identifier of the benefited terminal.

With reference to the second possible implementation manner of the second aspect, in a third possible implementation manner, the identifier of the benefited terminal includes at least one of the following:

an identifier of a beacon signal between the benefited terminal and the ready-to-support terminal, a device to device code D2Dcode, and an identity ID of a frequency band.

With reference to the second aspect or any possible implementation manner of the second aspect, in a fourth possible implementation manner, the system broadcast at least includes at least one of the following:

an indicator bit, used to instruct the idle ready-to-support terminal to serve as the ready-to-support terminal, and instruct the ready-to-support terminal to acquire the channel quality parameter between the ready-to-support terminal and the base station; and a first threshold, where the idle ready-to-support terminal triggers a ready-to-support instruction according to the first threshold, and the idle ready-to-support terminal serves as the ready-to-support terminal according to the ready-to-support instruction, and acquires the channel quality parameter between the ready-to-support terminal and the base station.

According to a third aspect, a method for establishing cooperative communication is provided, where the method is applied to a benefited terminal, and includes:

receiving, by the benefited terminal, a beacon signal information table sent by the base station;

acquiring, by the benefited terminal, a channel quality parameter between the benefited terminal and the base station;

selecting a beacon signal from the beacon signal information table according to the channel quality parameter between the benefited terminal and the base station, and sending the beacon signal to the ready-to-support terminal, so that the ready-to-support terminal acquires a channel quality parameter between the benefited terminal and the ready-to-support terminal according to the beacon signal;

receiving, by the benefited terminal, a benefited-cooperation indication sent by the base station; and establishing a cooperative communication set with the ready-to-support terminal according to the benefited-cooperation indication.

According to a fourth aspect, a ready-to-support terminal is provided, where the ready-to-support terminal is configured to establish cooperative communication, and includes:

a receiving unit, configured to: when the ready-to-support terminal is in an idle state, receive a system broadcast sent by the base station;

an acquiring unit, configured to acquire a channel quality parameter between the supporting terminal and the base station according to the system broadcast received by the receiving unit, where the acquiring unit is further configured to: when the channel quality parameter between the ready-to-support terminal and the base station meets a first threshold, acquire a channel quality parameter between the benefited terminal and the ready-to-support terminal;

a generation unit, configured to: when the channel quality parameter between the ready-to-support terminal and the benefited terminal meets a second threshold, generate a measurement event, and send the measurement event to the base station, so that the base station sends a supporting-cooperation indication to the ready-to-support terminal according to the measurement event; and an instruction unit, configured to receive the supporting-cooperation indication sent by the base station, and establish a cooperative communication set with the benefited terminal according to the supporting-cooperation indication.

With reference to the fourth aspect, in a first possible implementation manner, the receiving unit is further configured to:

receive a beacon signal sent by the benefited terminal; and the acquiring, by the acquiring unit, a channel quality parameter between the benefited terminal and the ready-to-support terminal specifically includes:

acquiring the channel quality parameter between the benefited terminal and the ready-to-support terminal by using the beacon signal.

With reference to the fourth aspect or the first possible implementation manner of the fourth aspect, in a second possible implementation manner, the measurement event sent by the sending unit includes: an identity ID of the measurement event, content of the measurement event, the channel quality parameter between the ready-to-support terminal and the base station, the channel quality parameter between the ready-to-support terminal and the benefited terminal, and an identifier of the benefited terminal.

With reference to the second possible implementation manner of the fourth aspect, in a third possible implementation manner, the content of the measurement event in the measurement event sent by the sending unit includes:

the channel quality parameter between the ready-to-support terminal and the base station meets the first threshold; and the channel quality parameter between the ready-to-support terminal and the benefited terminal meets the second threshold.

According to a fifth aspect, a base station is provided, where the base station is configured to establish cooperative communication, and includes:

a sending unit, configured to send a system broadcast to an idle ready-to-support terminal, so that the idle ready-to-support terminal serves as a ready-to-support terminal according to the system broadcast, and acquires a channel quality parameter between the ready-to-support terminal and the base station;

a receiving unit, configured to receive a measurement event sent by the ready-to-support terminal device; and an instruction unit, configured to send a supporting-cooperation indication to the ready-to-support terminal according to the measurement event received by the receiving unit, where the supporting-cooperation indication is used to notify the ready-to-support apparatus to establish a cooperative communication set with the benefited terminal, where the instruction unit is further configured to send a benefited-cooperation indication to the benefited terminal according to the measurement event received by the receiving unit, where the benefited-cooperation indication is used to notify the benefited terminal to establish a cooperative communication set with the ready-to-support terminal.

With reference to the fifth aspect, in a first possible implementation manner, the base station further includes:

a selection unit, configured to perform transmission rate detection on all terminals, and select a benefited terminal from all the terminals according to a detection result; and the sending unit is further configured to send a beacon signal information table to the benefited terminal selected by the selection unit, so that the benefited terminal selects a beacon signal from the beacon signal information table, and sends the beacon signal to the ready-to-support terminal.

With reference to the fifth aspect or the first possible implementation manner of the fifth aspect, in a second possible implementation manner, the measurement event received by the receiving unit includes: an identity ID of the measurement event, content of the measurement event, the channel quality parameter between the ready-to-support terminal and the base station, a channel quality parameter between the ready-to-support terminal and the benefited terminal, and an identifier of the benefited terminal.

With reference to the second possible implementation manner of the fifth aspect, in a third possible implementation manner, the identifier of the benefited terminal in the measurement event received by the receiving unit includes at least one of the following:

an identifier of a beacon signal between the benefited terminal and the ready-to-support terminal, a device to device code D2Dcode, and an identity ID of a frequency band.

With reference to the fifth aspect or any possible implementation manner of the fifth aspect, in a fourth possible implementation manner, the system broadcast includes at least one of an indicator bit and a first threshold, where the indicator bit is used to instruct the idle ready-to-support terminal to serve as the ready-to-support terminal, and instruct the ready-to-support terminal to acquire the channel quality parameter between the ready-to-support terminal and the base station; and the first threshold, where the idle ready-to-support terminal triggers a ready-to-support instruction according to the first threshold, and the idle ready-to-support terminal serves as the ready-to-support terminal according to the ready-to-support instruction, and acquires the channel quality parameter between the ready-to-support terminal and the base station.

According to a sixth aspect, a benefited terminal is provided, where the benefited terminal is configured to establish cooperative communication, and includes:

a receiving unit, configured to receive a beacon signal information table sent by the base station;

an acquiring unit, configured to acquire a channel quality parameter between the benefited terminal and the base station;

a sending unit, configured to select, according to the channel quality parameter between the benefited terminal and the base station acquired by the acquiring unit, a beacon signal from the beacon signal information table received by the receiving unit, and send the beacon signal to the ready-to-support terminal, so that the ready-to-support terminal acquires a channel quality parameter between the benefited terminal and the ready-to-support terminal according to the beacon signal, where the receiving unit is further configured to receive a benefited-cooperation indication sent by the base station; and an establishing unit, configured to establish a cooperative communication set with the ready-to-support terminal according to the benefited-cooperation indication received by the receiving unit.

According to a seventh aspect, a ready-to-support terminal is provided, including: a processor, a receiver, a transmitter, a memory, and a bus, where the processor, the receiver, the transmitter, and the memory are connected to each other by using the bus, and the memory is configured to store data processed by the processor;

the receiver is configured to: when the ready-to-support terminal is in an idle state, receive a system broadcast sent by the base station;

the processor is configured to acquire a channel quality parameter between the supporting terminal and the base station according to the system broadcast received by the receiver;

the processor is further configured to: when the channel quality parameter between the ready-to-support terminal and the base station meets a first threshold, acquire a channel quality parameter between the benefited terminal and the ready-to-support terminal;

the processor is further configured to: when the channel quality parameter between the ready-to-support terminal and the benefited terminal meets a second threshold, generate, by the ready-to-support terminal, a measurement event, and send the measurement event to the base station by using the transmitter, so that the base station sends a supporting-cooperation indication to the ready-to-support terminal according to the measurement event; and the processor is further configured to receive, by using the receiver, the supporting-cooperation indication sent by the base station, and establish a cooperative communication set with the benefited terminal according to the supporting-cooperation indication, thereby becoming a supporting terminal.

With reference to the seventh aspect, in a first possible implementation manner, the receiver is further configured to:

receive a beacon signal sent by the benefited terminal; and the acquiring, by the processor, a channel quality parameter between the benefited terminal and the ready-to-support terminal specifically includes:

acquiring the channel quality parameter between the benefited terminal and the ready-to-support terminal by using the beacon signal.

With reference to the seventh aspect or the first possible implementation manner of the seventh aspect, in a second possible implementation manner, the measurement event sent by the transmitter includes: an identity ID of the measurement event, content of the measurement event, the channel quality parameter between the ready-to-support terminal and the base station, the channel quality parameter between the ready-to-support terminal and the benefited terminal, and an identifier of the benefited terminal.

With reference to the second possible implementation manner of the seventh aspect, in a third possible implementation manner, the content of the measurement event in the measurement event sent by the transmitter includes:

the channel quality parameter between the ready-to-support terminal and the base station meets the first threshold; and the channel quality parameter between the ready-to-support terminal and the benefited terminal meets the second threshold.

According to an eighth aspect, a base station is provided, including: a processor, a receiver, a transmitter, a memory, and a bus, where the processor, the receiver, the transmitter, and the memory are connected to each other by using the bus, and the memory is configured to store data processed by the processor;

the transmitter is configured to send a system broadcast to an idle ready-to-support terminal, so that the idle ready-to-support terminal serves as a ready-to-support terminal according to the system broadcast, and acquires a channel quality parameter between the ready-to-support terminal and the base station;

the receiver is configured to receive a measurement event sent by the ready-to-support terminal device;

the processor is configured to send, by using the transmitter, a supporting-cooperation indication to the ready-to-support terminal according to the measurement event received by the receiver, where the supporting-cooperation indication is used to notify the ready-to-support apparatus to establish a cooperative communication set with the benefited terminal; and the processor is further configured to send, by using the transmitter, a benefited-cooperation indication to the benefited terminal according to the measurement event received by the receiver, where the benefited-cooperation indication is used to notify the benefited terminal to establish a cooperative communication set with the ready-to-support terminal.

With reference to the eighth aspect, in a first possible implementation manner, before the transmitter sends the system broadcast to the idle ready-to-support terminal, the processor is further configured to perform transmission rate detection on all terminals, and select a benefited terminal from all the terminals according to a detection result; and the transmitter is further configured to send a beacon signal information table to the benefited terminal, so that the benefited terminal selects a beacon signal from the beacon signal information table, and sends the beacon signal to the ready-to-support terminal.

With reference to the eighth aspect or the first possible implementation manner of the eighth aspect, in a second possible implementation manner, the measurement event received by the receiver includes: an identity ID of the measurement event, content of the measurement event, the channel quality parameter between the ready-to-support terminal and the base station, a channel quality parameter between the ready-to-support terminal and the benefited terminal, and an identifier of the benefited terminal.

With reference to the second possible implementation manner of the eighth aspect, in a third possible implementation manner, the identifier of the benefited terminal in the measurement event received by the receiver includes at least one of the following:

an identifier of a beacon signal between the benefited terminal and the ready-to-support terminal, a device to device code D2Dcode, and an identity ID of a frequency band.

With reference to the eighth aspect or any possible implementation manner of the eighth aspect, in a fourth possible implementation manner, the system broadcast includes at least one of an indicator bit and a first threshold, where the indicator bit is used to instruct the idle ready-to-support terminal to serve as the ready-to-support terminal, and instruct the ready-to-support terminal to acquire the channel quality parameter between the ready-to-support terminal and the base station; and the first threshold, where the idle ready-to-support terminal triggers a ready-to-support instruction according to the first threshold, and the idle ready-to-support terminal serves as the ready-to-support terminal according to the ready-to-support instruction, and acquires the channel quality parameter between the ready-to-support terminal and the base station.

According to a ninth aspect, a benefited terminal is provided, including: a processor, a receiver, a memory, and a bus, where the processor, the receiver, and the memory are connected to each other by using the bus, and the memory is configured to store data processed by the processor;

the receiver is configured to receive a beacon signal information table sent by the base station; the processor is configured to acquire a channel quality parameter between the benefited terminal and the base station;

the processor is further configured to select a beacon signal from the beacon signal information table according to the channel quality parameter between the benefited terminal and the base station, and send, by using a transmitter, the beacon signal to the ready-to-support terminal, so that the ready-to-support terminal acquires a channel quality parameter between the benefited terminal and the ready-to-support terminal according to the beacon signal;

the receiver is further configured to receive a benefited-cooperation indication sent by the base station; and the processor is further configured to establish a cooperative communication set with the ready-to-support terminal according to the benefited-cooperation indication.

According to a tenth aspect, a communications system is provided, including:

at least one ready-to-support terminal, at least one benefited terminal, and a base station, where all terminals are connected to and communicate with the base station, the ready-to-support terminal is the ready-to-support terminal in the fourth aspect, the base station is the base station in the fifth aspect, and the benefited terminal is the benefited terminal in the sixth aspect; or the ready-to-support terminal is the ready-to-support terminal in the seventh aspect, the base station is the base station in the eighth aspect, and the benefited terminal is the benefited terminal in the ninth aspect.

In the foregoing implementation method, an idle ready-to-support terminal receives a system broadcast sent by a base station, acquires a channel quality parameter between the ready-to-support terminal and the base station according to the system broadcast, and when the channel quality parameter between the ready-to-support terminal and the base station meets a first threshold, acquires a channel quality parameter between a benefited terminal and the ready-to-support terminal; and when the channel quality parameter between the benefited terminal and the ready-to-support terminal meets a second threshold, the ready-to-support terminal generates a measurement event, and sends the measurement event to the base station, so that the base station sends a supporting-cooperation indication to the ready-to-support terminal according to the measurement event; the ready-to-support terminal receives the supporting-cooperation indication sent by the base station, and establishes a cooperative communication set with the benefited terminal according to the supporting-cooperation indication. In this way, it is avoided that all ready-to-support terminals are connected to a base station to determine whether each ready-to-support terminal is capable of serving as a supporting terminal, thereby reducing power consumption.

BRIEF DESCRIPTION OF THE DRAWINGS

To describe the technical solutions in the embodiments of the present invention or in the prior art more clearly, the following briefly describes the accompanying drawings required for describing the embodiments or the prior art.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention.

Figure 1:
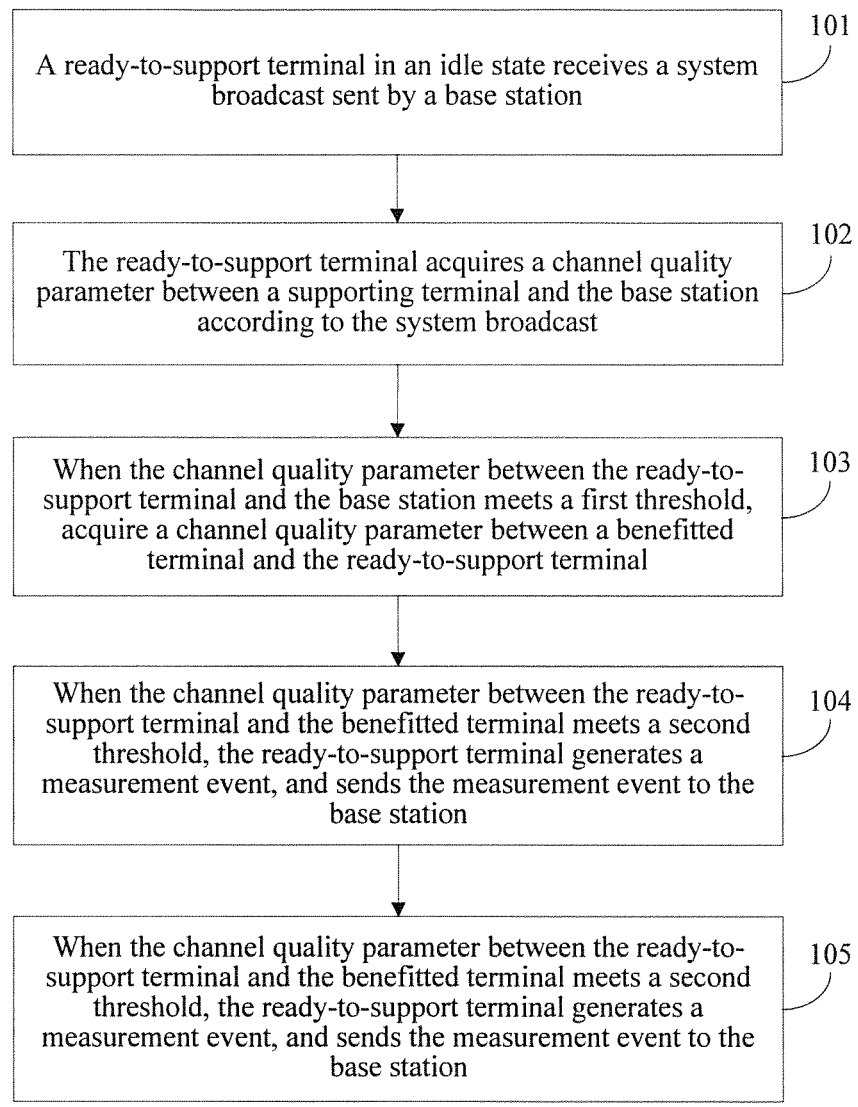
FIG. 1 is a schematic flowchart of a method for establishing cooperative communication according to an embodiment of the present invention.

An embodiment of the present invention provides a method for establishing cooperative communication by a ready-to-support terminal. Referring to FIG. 1, the ready-to-support terminal refers to a terminal that has a support function, and when the ready-to-support terminal can meet a condition for cooperative communication, the ready-to-support terminal can serve as a supporting terminal to perform cooperative communication. The method includes the following steps:

101: A ready-to-support terminal in an idle state receives a system broadcast sent by a base station.

The system broadcast is used to instruct the idle ready-to-support terminal to serve as a ready-to-support terminal, and instruct the ready-to-support terminal to acquire a channel quality parameter between the ready-to-support terminal and the base station.

102: The ready-to-support terminal acquires a channel quality parameter between the ready-to-support terminal and the base station according to the system broadcast.

The channel quality parameter represents quality of communication between two communications devices, and may specifically be a path loss level or a reference signal received power between the two communications devices. Herein the channel quality parameter between the ready-to-support terminal and the base station needs to be obtained.

Specifically, the ready-to-support terminal receives a downlink pilot signal sent by the base station, and acquires reference signal received power from the downlink pilot signal.

Alternatively, the ready-to-support terminal receives a downlink pilot signal and the system broadcast from the base station, acquires the reference signal received power from the downlink pilot signal, and acquires a transmit power of the base station from the system broadcast; and calculates a path loss level according to the reference signal received power and the transmit power of the base station.

A path loss value is equal to the transmit power minus the reference signal received power; or a more accurate path loss may be obtained when an antenna gain of the base station is obtained. In this case, a path loss value is equal to the transmit power of the base station minus the antenna gain of the base station and the reference signal received power.

TABLE 1

|  | Path loss level | | | | |
| --- | --- | --- | --- | --- | --- |
|  | Level 1 | Level 2 | Level 3 | . . . | Level 9 |
| Path loss value db | 77 | 83 | 89 | . . . | 125 |

For example, referring to Table 1, calculation of the path loss level begins with a path loss value of 77 db (db represents decibel, and is a unit of the path loss). The path loss level increases by one level each time the path loss value increases by 6 db. A higher level indicates worse communication quantity. The obtained path loss value is matched with path loss levels in Table 1, to obtain a corresponding path loss level. When a path loss level of a terminal is less than 77 db, it indicates that communication quality of the terminal is sufficiently good, and the terminal cannot serve as a benefited terminal; or when a path loss level of a terminal is less than 77 db, and a frequency used between cooperative terminals is a system frequency for communication between a base station and the terminals (for example, when a frequency used between cooperative terminals is an uplink frequency of an LTE system for communication between a base station and the terminals), if the terminal serves as a supporting terminal, the terminal interferes with a signal of the base station because the terminal is too close to the base station, and therefore the terminal cannot serve as a supporting terminal.

103: When the channel quality parameter between the ready-to-support terminal and the base station meets a first threshold, acquire a channel quality parameter between a benefited terminal and the ready-to-support terminal.

The first threshold is used to determine whether channel quality between the ready-to-support terminal and the base station is good, and the channel quality parameter is a path loss level between the ready-to-support terminal and the base station or a reference signal received power between the ready-to-support terminal and the base station.

A predetermined threshold in the first threshold is set by the base station, and is sent by the base station to the ready-to-support terminal.

Alternatively, when a channel quality parameter between the benefited terminal and the base station changes slowly, the channel quality parameter between the benefited terminal and the base station is used as a predetermined threshold, to obtain the first threshold, and the first threshold is forwarded by the base station to the ready-to-support terminal.

Alternatively, the first threshold is stipulated in the text of a standard protocol: For example, a threshold of the channel quality between the ready-to-support terminal and the base station is: a multiplied by a maximum transmit power of the base station, where a value of a is generally 0.8, 0.7, . . . , 0.4. In this way, the ready-to-support terminal may predetermine the threshold according to the standard protocol.

Specifically, when the channel quality parameter is the path loss level (a higher path loss level indicates a larger path loss value and worse channel quality), the path loss level between the ready-to-support terminal and the base station needs to be less than the predetermined threshold; in this way, it indicates that the channel quality between the ready-to-support terminal and the base station is good. Next, the path loss level between the ready-to-support terminal and the base station needs to be less than a path loss level between the benefited terminal and the base station; in this way, it indicates that the ready-to-support terminal has better channel quality than the benefited terminal, and can provide cooperative support for the benefited terminal.

Optionally, when the channel quality is the reference signal received power, the reference signal received power between the ready-to-support terminal and the base station needs to be greater than the predetermined threshold; in this way, it indicates that the channel quality between the ready-to-support terminal and the base station is good. Next, the reference signal received power between the ready-to-support terminal and the base station needs to be greater than a reference signal received power between the benefited terminal and the base station; in this way, it indicates that the ready-to-support terminal has better channel quality than the benefited terminal, and can provide cooperative support for the benefited terminal.

When a frequency used between cooperative terminals is a system frequency for communication between a base station and the terminals (for example, when a frequency used for communication between cooperative terminals is an uplink frequency of an LTE system for communication between a base station and the terminals), if the channel quality between the ready-to-support terminal and the base station exceeds a predetermined maximum threshold, the ready-to-support terminal cannot be selected as a supporting terminal, because in this case, the ready-to-support terminal is too close to the base station, and interferes with a signal of the base station.

104: When the channel quality parameter between the ready-to-support terminal and the benefited terminal meets a second threshold, the ready-to-support terminal generates a measurement event, and sends the measurement event to the base station;

so that the base station sends a supporting-cooperation indication to the ready-to-support terminal according to the measurement event.

The second threshold is used to determine whether channel quality between the ready-to-support terminal and the benefited terminal is good; the second threshold may be acquired from a broadcast message of the base station, or may be a determining criterion established by the terminal. The determining may be performed according to a path loss level between the ready-to-support terminal and the benefited terminal or a reference signal received power between the ready-to-support terminal and the benefited terminal.

Specifically, when the channel quality parameter is the path loss level, the path loss level between the ready-to-support terminal and the benefited terminal needs to be less than the predetermined threshold; in this way, it indicates that the channel quality between the ready-to-support terminal and the benefited terminal is good, and the ready-to-support terminal can provide cooperative support for the benefited terminal.

Optionally, when the channel quality parameter is the reference signal received power, the reference signal received power between the ready-to-support terminal and the benefited terminal needs to be greater than the predetermined threshold; in this way, it indicates that the channel quality between the ready-to-support terminal and the benefited terminal is good, and the ready-to-support terminal can provide cooperative support for the benefited terminal.

The measurement event includes: an ID of the measurement event, content of the measurement event, the channel quality parameter between the ready-to-support terminal and the base station, the channel quality parameter between the ready-to-support terminal and the benefited terminal, and an identifier of the benefited terminal. The content of the measurement event includes content of two determining events, which are respectively: the channel quality parameter between the ready-to-support terminal and the base station meets the first threshold, and the channel quality parameter between the ready-to-support terminal and the benefited terminal meets the second threshold.

When the second threshold is met, the ready-to-support terminal identifies itself as a candidate supporting terminal, generates a measurement event, and then initiates a radio connection to the base station, where the measurement event is reported, according to an LTE process, to the base station after the radio establishment; or reporting of the measurement event may be implemented in the following manner: a radio establishment request includes a bit that instructs the candidate supporting terminal to report the measurement event, and then the measurement event is reported in a reply to a subsequent query message of the base station; or the measurement event may be carried in a message that is in a radio establishment process.

Specifically, a process in which the ready-to-support terminal sends the measurement event to the base station is as follows:

After a measurement module of the ready-to-support terminal generates a measurement event: D1 event, the measurement module sends an instruction to an RRC (Radio Resource Control, radio resource control) module, where the instruction is: initiate a request for establishing an RRC link, and the request message carries the measurement event D1 and a reason for establishing the RRC link. The reason for establishing the RRC link is: initiation by the ready-to-support terminal.

Alternatively, after a measurement module of the ready-to-support terminal generates a measurement event, the measurement module sends an instruction to an RRC module, where the instruction is: initiate a request for establishing an RRC link, and the request message carries a reason for establishing the RRC link. The reason for establishing the RRC link is: the ready-to-support terminal generates a D1 event. Subsequently, the measurement event D1 is reported in a reply to a subsequent query message of the base station.

Alternatively, an RRC module of the ready-to-support terminal generates a measurement event D1 by means of determining and comparison according to an underlying measurement result, and the generation of the measurement event D1 triggers the RRC module to generate a request message for establishing an RRC link, where the request message carries the measurement event D1 and a reason for establishing the RRC link. The reason for establishing the RRC link is: initiation by the ready-to-support terminal.

Alternatively, an RRC module of the ready-to-support terminal generates a measurement event D1 by means of determining and comparison according to an underlying measurement result, and the generation of the measurement event D1 triggers the RRC module to generate a request message for establishing an RRC link, where the request message carries a reason for establishing the RRC link. The reason for establishing the RRC link is: the ready-to-support terminal generates a D1 event. Subsequently, the measurement event D1 is reported in a reply to a subsequent query message of the base station.

The base station obtains the measurement event D1 and the reason for establishing the RRC link from the request for establishing the RRC link; or the base station obtains the reason for establishing the RRC link from the request for establishing the RRC link, and then acquires the measurement event D1 from the reply to the subsequent query message of the base station.

105: The ready-to-support terminal receives the supporting-cooperation indication sent by the base station, and establishes a cooperative communication set with the benefited terminal according to the supporting-cooperation indication.

In the foregoing embodiment, an idle ready-to-support terminal receives a system broadcast sent by a base station, acquires a channel quality parameter between the ready-to-support terminal and the base station according to the system broadcast, and when the channel quality parameter between the ready-to-support terminal and the base station meets a first threshold, acquires a channel quality parameter between a benefited terminal and the ready-to-support terminal; and when the channel quality parameter between the benefited terminal and the ready-to-support terminal meets a second threshold, the ready-to-support terminal generates a measurement event, and sends the measurement event to the base station, so that the base station sends a supporting-cooperation indication to the ready-to-support terminal according to the measurement event; the ready-to-support terminal receives the supporting-cooperation indication sent by the base station, and establishes a cooperative communication set with the benefited terminal according to the supporting-cooperation indication. In this way, it is avoided that all ready-to-support terminals are connected to a base station to determine whether each ready-to-support terminal is capable of serving as a supporting terminal, thereby reducing power consumption.

Figure 2:
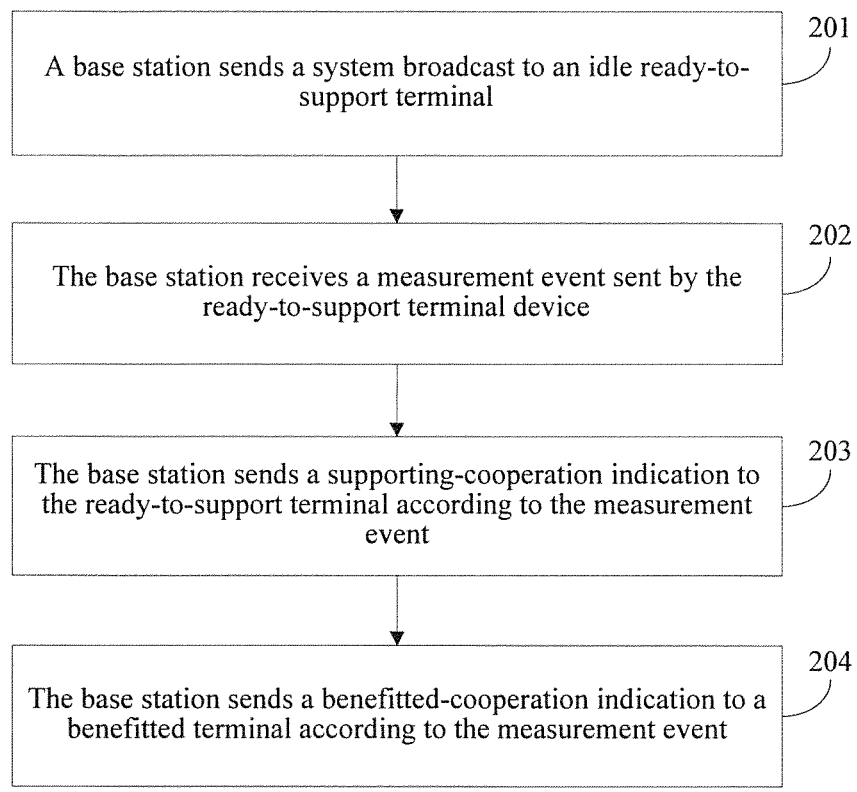
FIG. 2 is a schematic flowchart of a method for establishing cooperative communication according to another embodiment of the present invention.

Further, an embodiment of the present invention provides a method for establishing cooperative communication by a base station. Referring to FIG. 2, the method includes the following steps:

201: A base station sends a system broadcast to an idle ready-to-support terminal.

The system broadcast is used to notify the idle ready-to-support terminal to serve as a ready-to-support terminal, and instruct the ready-to-support terminal to acquire a channel quality parameter between the ready-to-support terminal and the base station.

The system broadcast includes at least one of an indicator bit and a first threshold, where when the system broadcast includes only the indicator bit, the indicator bit instructs the idle ready-to-support terminal to serve as the ready-to-support terminal, and instructs the ready-to-support terminal to acquire the channel quality parameter between the ready-to-support terminal and the base station;

when the system broadcast includes only the first threshold, the idle ready-to-support terminal triggers a ready-to-support instruction according to the first threshold, and the idle ready-to-support terminal serves as the ready-to-support terminal according to the ready-to-support instruction, and acquires the channel quality parameter between the ready-to-support terminal and the base station; and certainly, the system broadcast sent by the base station may also include both the indicator bit and the first threshold.

202: The base station receives a measurement event sent by the ready-to-support terminal device.

The measurement event includes: an ID (Identity, identity) of the measurement event, content of the measurement event, the channel quality parameter between the ready-to-support terminal and the base station, a channel quality parameter between the ready-to-support terminal and a benefited terminal, and an identifier of the benefited terminal, so that the base station sends a cooperative communication instruction according to the measurement event.

The identifier of the benefited terminal includes at least one of an index of a beacon signal between the benefited terminal and a supporting terminal, a D2Dcode (Device to Device Code, device to device code), and an ID of a frequency band, where the device to device code D2Dcode is used as a terminal device identifier used for a discovery function, and the identifier is allocated by a core network.

203: The base station sends a supporting-cooperation indication to the ready-to-support terminal according to the measurement event.

The supporting-cooperation indication is used to notify the ready-to-support apparatus to establish a cooperative communication set with the benefited terminal, so as to make the ready-to-support terminal become a supporting terminal.

204: The base station sends a benefited-cooperation indication to a benefited terminal according to the measurement event.

The benefited-cooperation indication is used to notify the benefited terminal to establish a cooperative communication set with the ready-to-support terminal, where the cooperation indication includes at least a cooperation resource parameter.

The foregoing embodiment is a method for performing cooperative communication by a base station. The base station sends a system broadcast to an idle ready-to-support terminal, to notify the idle ready-to-support terminal to serve as a ready-to-support terminal for a benefited terminal, and instruct the ready-to-support terminal to acquire a channel quality parameter, and the ready-to-support terminal performs determining according to the channel quality parameter. If a condition is met, the ready-to-support terminal sends a measurement event to the base station, and the base station notifies, according to the measurement event, the ready-to-support terminal to establish a cooperative communication set with the benefited terminal. In this way, it is avoided that all ready-to-support terminals are connected to a base station to determine whether each ready-to-support terminal is capable of serving as a supporting terminal, thereby reducing power consumption. By means of a system broadcast, an idle ready-to-support terminal is notified to serve as a ready-to-support terminal for a benefited terminal, where the system broadcast can cover all terminals within an allowed range of a base station system, increasing a quantity of available ready-to-support terminals.

Figure 3:
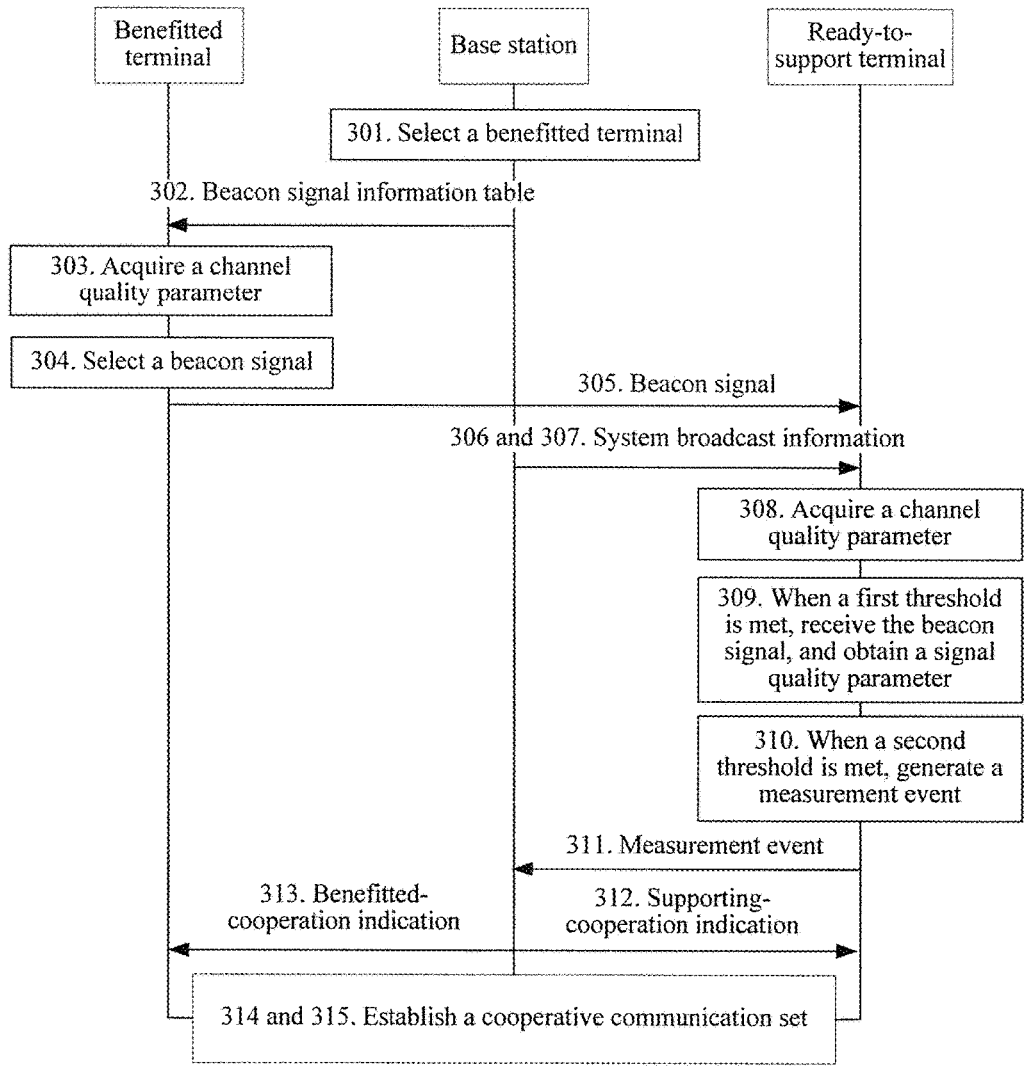
FIG. 3 is a schematic flowchart of a method for establishing cooperative communication according to still another embodiment of the present invention.

Optionally, referring to FIG. 3, an embodiment of the present invention provides a cooperative communication method (certainly, only key characteristics in steps are provided in the accompanying drawing; and specifics are subject to descriptions in the embodiment), including the following steps:

301: A base station performs transmission rate detection on all terminals, and selects a benefited terminal from all the terminals according to a detection result.

302: The base station sends a beacon signal information table to the benefited terminal.

Referring to Table 2, the beacon signal information table refers to a table of a correspondence between beacon signal sequence numbers and channel quality parameter levels. Each beacon signal has a corresponding sequence number, and channel quality parameters are classified into several levels according to values of the channel quality parameters. Each beacon signal corresponds to one channel quality level. The beacon signal information table is a table in which sequence numbers of beacon signals correspond to channel quality levels.

TABLE 2

| | Channel quality parameter level | | |
| --- | --- | --- | --- |
| | 1 | 2 | ... | 10 |
| Beacon signal sequence number | 1, 11 | 2, 12 | ... | 10, 20 |

303: The benefited terminal acquires a channel quality parameter between the benefited terminal and the base station.

A method for acquiring the channel quality parameter between the benefited terminal and the base station by the benefited terminal is the same as a method for acquiring a channel quality parameter between a ready-to-support terminal and the base station by the ready-to-support terminal in step 102. Details are not described herein again.

304: The benefited terminal selects a beacon signal from the beacon signal information table according to the channel quality parameter between the benefited terminal and the base station.

305: The benefited terminal sends the selected beacon signal to a ready-to-support terminal.

Specifically, refer to Table 2, where the beacon signal information table refers to a table of a correspondence between beacon signal sequence numbers and channel quality parameter levels. From Table 2, the benefited terminal can select, according to the channel quality parameter between the benefited terminal and the base station, a corresponding beacon signal to send. For example, if a channel quality parameter level between the benefited terminal and the base station is 2, a beacon signal 2 or a beacon signal 12 may be selected and sent.

The beacon signal information table may also include a transmit power and a sending time of the beacon signal, and the benefited terminal sends the beacon signal to the ready-to-support terminal according to the transmit power and the sending time. When the beacon signal information table does not include the sending time, the benefited terminal constantly sends the beacon signal according to a cycle, where the base station may notify the benefited terminal of the sending cycle, or the benefited terminal may select the sending cycle. When the beacon signal information table does not include the transmit power, the benefited terminal may use a maximum transmit power of the benefited terminal, or the benefited terminal may use a transmit power at which the benefited terminal sends data to the base station, where a data length is a specific value (for example, a data block size TB size is 72 bits), and a modulation mode and an encoding rate are configured by the base station.

For example, the foregoing beacon signals may be in a ZC sequence, and may be classified into a total of 48 groups, where each group includes 16 beacon signals at most. Multiple cooperative communication sets may exist in one communication area. Each group includes beacon signals that are generated by using a same seed ZC sequence, and therefore these communications cooperation sets can be distinguished from each other.

306: The base station sends a system broadcast to the ready-to-support terminal.

The system broadcast is described in detail in step 201, and details are not described herein again.

307: The ready-to-support terminal in an idle state receives the system broadcast sent by the base station.

The system broadcast is used to notify the idle ready-to-support terminal to serve as a ready-to-support terminal, and instruct the ready-to-support terminal to acquire a channel quality parameter between the ready-to-support terminal and the base station.

308: The ready-to-support terminal acquires a channel quality parameter between a supporting terminal and the base station according to an instruction of the system broadcast.

309: When the channel quality parameter between the ready-to-support terminal and the base station meets a first threshold, the ready-to-support terminal receives the beacon signal sent by the benefited terminal, and acquires a channel quality parameter between the benefited terminal and the ready-to-support terminal by using the beacon signal.

A specific determining method is already described after step 103, and details are not described herein again. If the channel quality parameter between the ready-to-support terminal and the base station meets the first threshold, the cooperative communication continues to be established; or if the channel quality parameter between the ready-to-support terminal and the base station does not meet the first threshold, the ready-to-support terminal stops establishing the cooperative communication.

The ready-to-support terminal that meets the first threshold may monitor a beacon signal by searching a discovery resource configuration of the base station, all frequency bands, or a resource that is exclusively used by the benefited terminal, and receive the beacon signal.

The channel quality parameter between the benefited terminal and the ready-to-support terminal is a path loss level or a reference signal received power. The ready-to-support terminal receives the beacon signal, and queries a beacon signal table for a channel quality parameter of the beacon signal.

The ready-to-support terminal may acquire the beacon signal table from a system broadcast of the base station, or the beacon signal carries the beacon signal table.

310: When the channel quality parameter between the ready-to-support terminal and the benefited terminal meets a second threshold, the ready-to-support terminal generates a measurement event.

A specific determining method is already described after step 104 and details are not described herein again. If the channel quality parameter between the ready-to-support terminal and the benefited terminal meets the second threshold, the cooperative communication continues to be established; or if the channel quality parameter between the ready-to-support terminal and the benefited terminal does not meet the second threshold, the ready-to-support terminal stops establishing the cooperative communication.

311: The ready-to-support terminal sends the measurement event to the base station.

A specific process of reporting the measurement event is specifically described after step 104, and details are not described herein again.

The measurement event includes: an identity ID of the measurement event, content of the measurement event, the channel quality parameter between the ready-to-support terminal and the base station, the channel quality parameter between the ready-to-support terminal and the benefited terminal, and an identifier of the benefited terminal. The content of the measurement event includes content of two determining events, which are respectively: the channel quality parameter between the ready-to-support terminal and the base station meets the first threshold, and the channel quality parameter between the ready-to-support terminal and the benefited terminal meets the second threshold.

312: The base station sends a supporting-cooperation indication to the ready-to-support terminal according to the measurement event.

The supporting-cooperation indication is used to notify the ready-to-support apparatus to establish a cooperative communication set with the benefited terminal, so as to make the ready-to-support terminal become a supporting terminal.

313: The base station sends a benefited-cooperation indication to the benefited terminal according to the measurement event.

The benefited-cooperation indication is used to notify the benefited terminal to establish a cooperative communication set with the ready-to-support terminal.

314: The ready-to-support terminal receives the supporting-cooperation indication sent by the base station, and establishes a cooperative communication set with the benefited terminal according to the supporting-cooperation indication, thereby becoming a supporting terminal.

315: The ready-to-support terminal receives the supporting-cooperation indication sent by the base station, and establishes a cooperative communication set with the benefited terminal according to the supporting-cooperation indication.

In the foregoing embodiment, only a process in which cooperative communication is established between one benefited terminal and one ready-to-support terminal is described. Certainly, another benefited terminal or multiple ready-to-support terminals that meet a preset condition may also be added to a cooperative communication set according to the method in the embodiment, thereby forming manners of cooperative communication between multiple supporting terminals and a single benefited terminal, between a single benefited terminal and multiple benefited terminals, and between multiple supporting terminals and multiple benefited terminals.

In the foregoing embodiment, a base station sends a system broadcast to an idle ready-to-support terminal, to notify the idle ready-to-support terminal to serve as a ready-to-support terminal, and instruct the ready-to-support terminal to acquire a channel quality parameter between the ready-to-support terminal and the base station, and the ready-to-support terminal performs determining according to the channel quality parameter between the ready-to-support terminal and the base station. If a condition is met, the ready-to-support terminal further determines a channel quality parameter between the ready-to-support terminal and a benefited terminal. If a condition is met, the ready-to-support terminal sends a measurement event to the base station, and the base station notifies, according to the measurement event, the ready-to-support terminal to establish a cooperative communication set with the benefited terminal. In this way, it is avoided that all ready-to-support terminals are connected to a base station to determine whether each ready-to-support terminal is capable of serving as a supporting terminal, thereby reducing power consumption.

Figure 4:
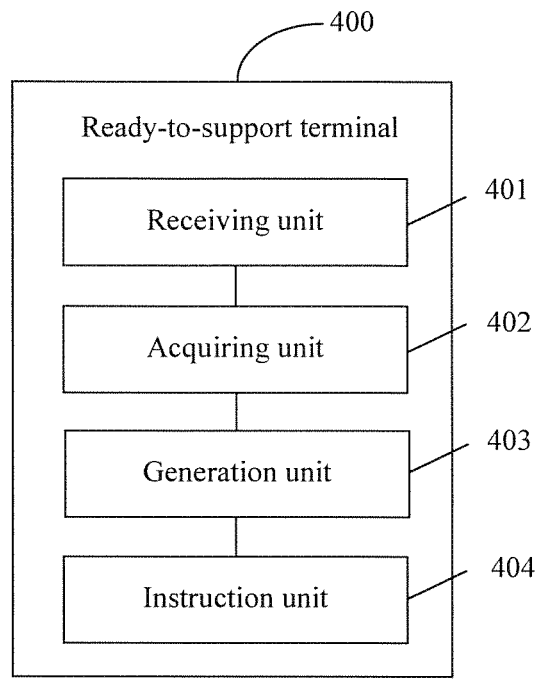
FIG. 4 is a schematic structural diagram of an apparatus for establishing cooperative communication according to an embodiment of the present invention.

As shown in FIG. 4, an embodiment of the present invention provides a ready-to-support terminal 400 for establishing cooperative communication, where the ready-to-support terminal 400 refers to a terminal that has a support capability. When the ready-to-support terminal 400 can meet a condition for cooperative communication, the ready-to-support terminal 400 can serve as a supporting terminal to support a cooperative communication set. The ready-to-support terminal 400 includes: a receiving unit 401, an acquiring unit 402, a generation unit 403, and an instruction unit 404.

The receiving unit 401 is configured to: when the ready-to-support terminal is in an idle state, receive a system broadcast sent by a base station.

The system broadcast is used to notify the idle ready-to-support terminal to serve as a ready-to-support terminal, and instruct the ready-to-support terminal to acquire a channel quality parameter between the ready-to-support terminal and the base station.

The acquiring unit 402 is configured to acquire a channel quality parameter between the supporting terminal and the base station according to the system broadcast received by the receiving unit 401, where the channel quality parameter represents quality of communication between two communications devices, and may specifically be a path loss level or a reference signal received power between the two communications devices. Herein the channel quality parameter between the ready-to-support terminal and the base station needs to be obtained.

Specifically, the ready-to-support terminal receives a downlink pilot signal sent by the base station, and acquires reference signal received power from the downlink pilot signal.

Alternatively, the ready-to-support terminal receives a downlink pilot signal and the system broadcast from the base station, acquires the reference signal received power from the downlink pilot signal, and acquires a transmit power of the base station from the system broadcast; and calculates a path loss level according to the reference signal received power and the transmit power of the base station.

A path loss value is equal to the transmit power minus the reference signal received power; or a more accurate path loss may be obtained when an antenna gain of the base station is obtained. In this case, a path loss value is equal to the transmit power of the base station minus the antenna gain of the base station and the reference signal received power.

The acquiring unit 402 is further configured to: when a determining result of a first determining unit meets a first threshold, acquire a channel quality parameter between a benefited terminal and the ready-to-support terminal.

A predetermined threshold in the first threshold is set by the base station, and is sent by the base station to the ready-to-support terminal.

Alternatively, when a channel quality parameter between the benefited terminal and the base station changes slowly, the channel quality parameter between the benefited terminal and the base station is used as a predetermined threshold, to obtain the first threshold, and the first threshold is forwarded by the base station to the ready-to-support terminal.

Alternatively, the first threshold is stipulated in the text of a standard protocol: For example, a threshold of the channel quality between the supporting terminal and the base station is: a multiplied by a maximum transmit power of the base station, where a value of a is generally 0.8, 0.7, . . . , 0.4. In this way, the ready-to-support terminal may predetermine the threshold according to the standard protocol.

If the channel quality parameter between the ready-to-support terminal and the base station meets the first threshold, the cooperative communication continues to be established; or if the channel quality parameter between the ready-to-support terminal and the base station does not meet the first threshold, the ready-to-support terminal stops establishing the cooperative communication.

The generation unit 403 is configured to: when a determining result of a second determining unit meets a second threshold, generate, by the ready-to-support terminal, a measurement event, and send the measurement event to the base station;

so that the base station sends a supporting-cooperation indication to the ready-to-support terminal according to the measurement event.

If the channel quality parameter between the ready-to-support terminal and the base station meets the second threshold, the cooperative communication continues to be established; or if the channel quality parameter between the ready-to-support terminal and the base station does not meet the second threshold, the ready-to-support terminal stops establishing the cooperative communication.

The measurement event includes: an ID of the measurement event, content of the measurement event, the channel quality parameter between the ready-to-support terminal and the base station, the channel quality parameter between the ready-to-support terminal and the benefited terminal, and an identifier of the benefited terminal. The content of the measurement event includes content of two determining events, which are respectively: the channel quality parameter between the ready-to-support terminal and the base station meets the first threshold, and the channel quality parameter between the ready-to-support terminal and the benefited terminal meets the second threshold.

When the second threshold is met, the ready-to-support terminal identifies itself as a candidate supporting terminal, generates a measurement event, and then initiates a radio connection to the base station, where the measurement event is reported, according to an LTE process, to the base station after the radio establishment; or reporting of the measurement event may be implemented in the following manner: a radio establishment request includes a bit that instructs the candidate supporting terminal to report the measurement event, and then the measurement event is reported in a reply to a subsequent query message of the base station; or the measurement event may be carried in a message that is in a radio establishment process.

Specifically, a process in which the ready-to-support terminal sends the measurement event to the base station is as follows:

After a measurement module of the ready-to-support terminal generates a measurement event D1, the measurement module sends an instruction to an RRC module, where the instruction is: initiate a request for establishing an RRC link, and the request message carries the measurement event D1 and a reason for establishing the RRC link. The reason for establishing the RRC link is: initiation by the ready-to-support terminal.

Alternatively, after a measurement module of the ready-to-support terminal generates a measurement event, the measurement module sends an instruction to an RRC module, where the instruction is: initiate a request for establishing an RRC link, and the request message carries a reason for establishing the RRC link. The reason for establishing the RRC link is: the ready-to-support terminal generates a D1 event. Subsequently, the measurement event D1 is reported in a reply to a subsequent query message of the base station.

Alternatively, an RRC module of the ready-to-support terminal generates a measurement event D1 by means of determining and comparison according to an underlying measurement result, and the generation of the measurement event D1 triggers the RRC module to generate a request message for establishing an RRC link, where the request message carries the measurement event D1 and a reason for establishing the RRC link. The reason for establishing the RRC link is: initiation by the ready-to-support terminal.

Alternatively, an RRC module of the ready-to-support terminal generates a measurement event D1 by means of determining and comparison according to an underlying measurement result, and the generation of the measurement event D1 triggers the RRC module to generate a request message for establishing an RRC link, where the request message carries a reason for establishing the RRC link. The reason for establishing the RRC link is: the ready-to-support terminal generates a D1 event. Subsequently, the measurement event D1 is reported in a reply to a subsequent query message of the base station.

The base station obtains the measurement event D1 and the reason for establishing the RRC link from the request for establishing the RRC link; or the base station obtains the reason for establishing the RRC link from the request for establishing the RRC link, and then acquires the measurement event D1 from the reply to the subsequent query message of the base station.

The instruction unit 404 is configured to receive the supporting-cooperation indication sent by the base station, and establish a cooperative communication set with the benefited terminal according to the supporting-cooperation indication.

Optionally, the receiving unit 401 is further configured to: receive a beacon signal sent by the benefited terminal; and the acquiring, by the acquiring unit 402, a channel quality parameter between a benefited terminal and the ready-to-support terminal specifically includes:

acquiring the channel quality parameter between the benefited terminal and the ready-to-support terminal by using the beacon signal.

The ready-to-support terminal that meets the first threshold may monitor a beacon signal by searching a discovery resource configuration of the base station, all frequency bands, or a resource that is exclusively used by the benefited terminal, and receive the beacon signal.

The channel quality parameter between the benefited terminal and the ready-to-support terminal is a path loss level or a reference signal received power. The ready-to-support terminal receives the beacon signal, and queries a beacon signal table for a channel quality parameter of the beacon signal.

The ready-to-support terminal may acquire the beacon signal table from a system broadcast of the base station, or the beacon signal carries the beacon signal table.

In the foregoing embodiment, the idle ready-to-support terminal receives a system broadcast sent by a base station, acquires a channel quality parameter between the ready-to-support terminal and the base station according to the system broadcast, and when the channel quality parameter between the ready-to-support terminal and the base station meets a first threshold, acquires a channel quality parameter between a benefited terminal and the ready-to-support terminal; and when the channel quality parameter between the benefited terminal and the ready-to-support terminal meets a second threshold, the ready-to-support terminal generates a measurement event, and sends the measurement event to the base station, so that the base station sends a supporting-cooperation indication to the ready-to-support terminal according to the measurement event; the ready-to-support terminal receives the supporting-cooperation indication sent by the base station, and establishes a cooperative communication set with the benefited terminal according to the supporting-cooperation indication. In this way, it is avoided that all ready-to-support terminals are connected to a base station to determine whether each ready-to-support terminal is capable of serving as a supporting terminal, thereby reducing power consumption. In addition, only a ready-to-support terminal that meets a preset condition sends a measurement event to the base station, and a ready-to-support terminal that does not meet the preset condition no longer initiates a process of establishing a connection to the base station, thereby reducing burden of the ready-to-support terminal and the base station.

Figure 5:
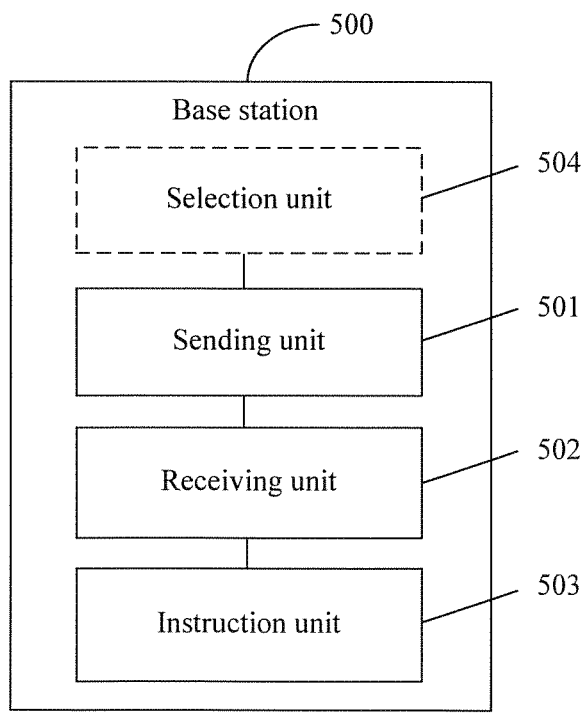
FIG. 5 is a schematic structural diagram of an apparatus for establishing cooperative communication according to another embodiment of the present invention.

Referring to FIG. 5, an embodiment of the present invention provides a base station 500 for establishing cooperative communication, including: a sending unit 501, a receiving unit 502, and an instruction unit 503.

The sending unit 501 is configured to send a system broadcast to an idle ready-to-support terminal.

The system broadcast is used to notify the idle ready-to-support terminal to serve as a ready-to-support terminal, and instruct the ready-to-support terminal to acquire a channel quality parameter between the ready-to-support terminal and the base station.

The system broadcast includes at least one of an indicator bit and a first threshold, where when the system broadcast includes only the indicator bit, the indicator bit instructs the idle ready-to-support terminal to serve as the ready-to-support terminal, and instructs the ready-to-support terminal to acquire the channel quality parameter between the ready-to-support terminal and the base station;

when the system broadcast includes only the first threshold, the idle ready-to-support terminal triggers a ready-to-support instruction according to the first threshold, and the idle ready-to-support terminal serves as the ready-to-support terminal according to the ready-to-support instruction, and acquires the channel quality parameter between the ready-to-support terminal and the base station; and certainly, the system broadcast sent by the base station may also include both the indicator bit and the first threshold.

The receiving unit 502 is configured to receive a measurement event sent by the ready-to-support terminal device.

The measurement event includes: an identity ID of the measurement event, content of the measurement event, the channel quality parameter between the ready-to-support terminal and the base station, a channel quality parameter between the ready-to-support terminal and a benefited terminal, and an identifier of the benefited terminal, so that the base station sends a cooperative communication instruction according to the measurement event.

The identifier of the benefited terminal includes at least one of an index of a beacon signal between the benefited terminal and a supporting terminal, a device to device code D2Dcode, and an ID of a frequency band, where the device to device code D2Dcode is used as a terminal device identifier for a discovery function, and the identifier is allocated by a core network.

The instruction unit 503 is configured to send a supporting-cooperation indication to the ready-to-support terminal according to the measurement event received by the receiving unit 502, where the supporting-cooperation indication is used to notify the ready-to-support apparatus to establish a cooperative communication set with the benefited terminal.

The instruction unit 503 is further configured to send a benefited-cooperation indication to the benefited terminal according to the measurement event received by the receiving unit 502, where the benefited-cooperation indication is used to notify the benefited terminal to establish a cooperative communication set with the ready-to-support terminal.

Optionally, before the base station 500 sends the system broadcast to the idle ready-to-support terminal by using the sending unit 501, the base station 500 further includes:

a selection unit 504, configured to perform transmission rate detection on all terminals, and select a benefited terminal from all the terminals according to a detection result, where the sending unit 501 is further configured to send a beacon signal information table to the benefited terminal selected by the selection unit 504, so that the benefited terminal selects a beacon signal from the beacon signal information table, and sends the beacon signal to the ready-to-support terminal.

In the foregoing embodiment, the base station sends a system broadcast to an idle ready-to-support terminal, to notify the idle ready-to-support terminal to serve as a ready-to-support terminal for a benefited terminal, and instruct the ready-to-support terminal to acquire a channel quality parameter, and the ready-to-support terminal performs determining according to the channel quality parameter. If a condition is met, the ready-to-support terminal sends a measurement event to the base station, and the base station notifies, according to the measurement event, the ready-to-support terminal to establish a cooperative communication set with the benefited terminal. In this way, it is avoided that all ready-to-support terminals are connected to a base station to determine whether each ready-to-support terminal is capable of serving as a supporting terminal, thereby reducing power consumption. By means of a system broadcast, an idle ready-to-support terminal is notified to serve as a ready-to-support terminal for a benefited terminal, where the system broadcast can cover all terminals within an allowed range of a base station system, increasing a quantity of available ready-to-support terminals.

Figure 6:
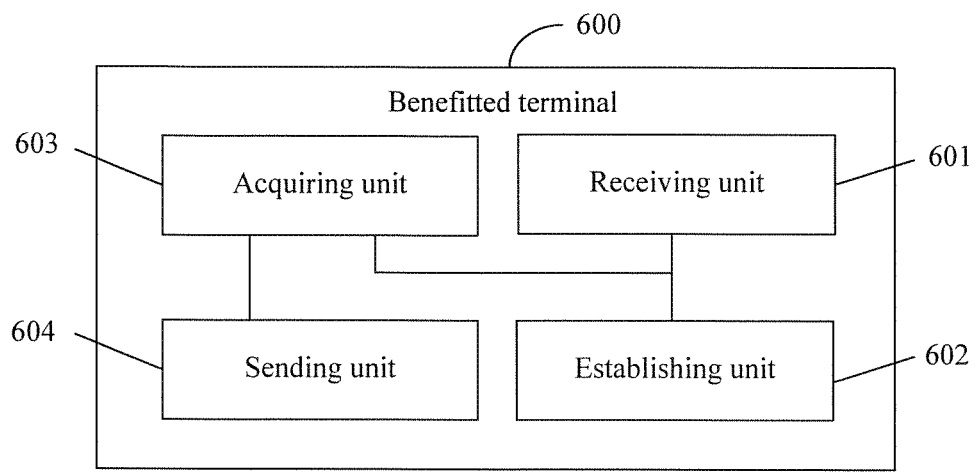
FIG. 6 is a schematic structural diagram of an apparatus for establishing cooperative communication according to still another embodiment of the present invention.

Referring to FIG. 6, an embodiment of the present invention provides a benefited terminal 600 for establishing cooperative communication, including: a receiving unit 601, an acquiring unit 602, an establishing unit 603, and a sending unit 604.

The receiving unit 601 is configured to receive a beacon signal information table sent by a base station.

The beacon signal information table refers to a table of a correspondence between beacon signal sequence numbers and channel quality parameter levels. Each beacon signal has a corresponding sequence number, and channel quality parameters are classified into several levels according to values of the channel quality parameters. Each beacon signal corresponds to one channel quality level. The beacon signal information table is a table in which sequence numbers of beacon signals correspond to channel quality levels, where for the beacon signal information table, reference may be made to Table 2.

The beacon signal information table may also include a transmit power and a sending time of the beacon signal, and the benefited terminal sends the beacon signal to the ready-to-support terminal according to the transmit power and the sending time. When the beacon signal information table does not include the sending time, the benefited terminal constantly sends the beacon signal according to a cycle, where the base station may notify the benefited terminal of the sending cycle, or the benefited terminal may select the sending cycle. When the beacon signal information table does not include the transmit power, the benefited terminal may use a maximum transmit power of the benefited terminal, or the benefited terminal may use a transmit power at which the benefited terminal sends data to the base station, where a data length is a specific value (for example, a data block size TB size is 72 bits), and a modulation mode and an encoding rate are configured by the base station.

The acquiring unit 602 is configured to acquire a channel quality parameter between the benefited terminal and the base station.

A manner in which the channel quality parameter between the benefited terminal and the base station is acquired is the same as the acquiring manner used by the acquiring unit 402 of the ready-to-support terminal. Details are not described herein again.

The sending unit 604 is configured to select, according to the channel quality parameter between the benefited terminal and the base station acquired by the acquiring unit 602, a beacon signal from the beacon signal information table received by the receiving unit 601, and send the beacon signal to the ready-to-support terminal, so that the ready-to-support terminal acquires a channel quality parameter between the benefited terminal and the ready-to-support terminal according to the beacon signal.

The receiving unit 601 is further configured to receive a benefited-cooperation indication sent by the base station.

The establishing unit 603 is configured to establish a cooperative communication set with the ready-to-support terminal according to the benefited-cooperation indication received by the receiving unit.

In the foregoing embodiment, the benefited terminal sends a beacon signal to a ready-to-support terminal by using a beacon signal information table, so that the ready-to-support terminal acquires a channel quality parameter between the benefited terminal and the ready-to-support terminal. It is avoided that all ready-to-support terminals are connected to a base station to detect channel quality between each ready-to-support terminal and the base station, thereby reducing power consumption of the ready-to-support terminal.

Figure 7:
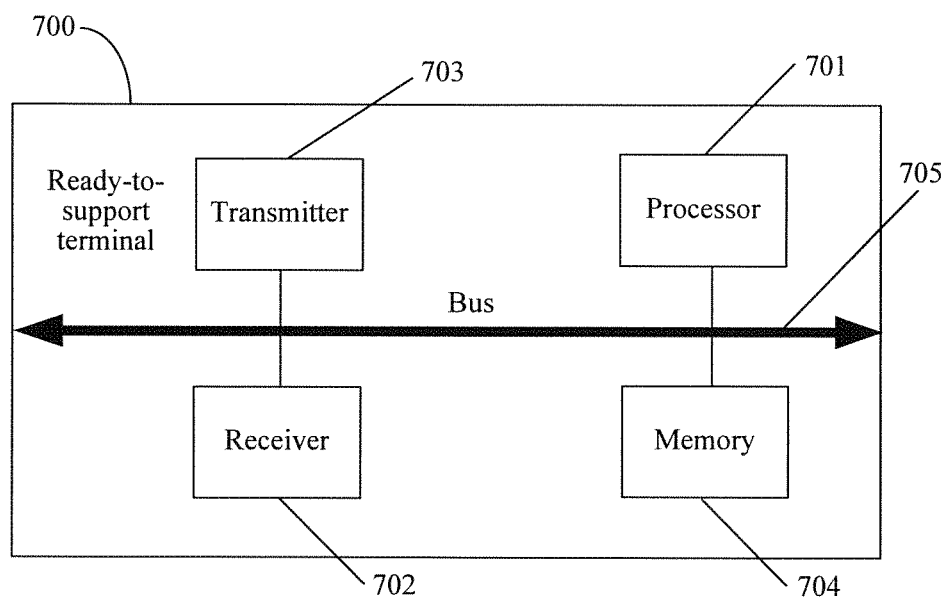
FIG. 7 is a schematic structural diagram of an apparatus for establishing cooperative communication according to yet another embodiment of the present invention.

An embodiment of the present invention provides a ready-to-support terminal 700. Referring to FIG. 7, the ready-to-support terminal 700 refers to a terminal that has a supporting capability. When the ready-to-support terminal 700 can meet a condition for cooperative communication, the ready-to-support terminal 700 may serve as a supporting terminal. The ready-to-support terminal 700 includes: a processor 701, a receiver 702, a transmitter 703, a memory 704, and a bus 705, where the processor 701, the receiver 702, the transmitter 703, and the memory 704 are connected to each other by using the bus 705, and the memory 704 is configured to store data processed by the processor;

the bus 705 may be an ISA (Industry Standard Architecture, Industry Standard Architecture) bus, a PCI (Peripheral Component, Peripheral Component Interconnect) bus, an EISA (Extended Industry Standard Architecture, Extended Industry Standard Architecture) bus, or the like; the bus 705 may be classified into an address bus, a data bus, a control bus, and the like, and is indicated by using only one bold line in FIG. 7 for the convenience of expression, which however does not indicate that there is only one bus or one type of bus, where:

the memory 704 is configured to store executable program code, and the program code includes a computer operation instruction; and the memory 704 may include a high-speed RAM memory, and may further include a non-volatile memory (non-volatile memory), for example, at least one magnetic disk memory.

The processor 701 may be a central processor (Central Processing Unit, CPU for short), or an application specific integrated circuit (Application Specific Integrated Circuit, ASIC for short), or configured as one or more integrated circuits that implement this embodiment of the present invention.

The receiver is configured to: when the ready-to-support terminal is in an idle state, receive a system broadcast sent by a base station.

The system broadcast is used to notify the idle ready-to-support terminal to serve as a ready-to-support terminal, and instruct the ready-to-support terminal to acquire a channel quality parameter between the ready-to-support terminal and the base station.

The processor 701 is configured to acquire a channel quality parameter between the supporting terminal and the base station according to an instruction of the system broadcast received by the receiver 702.

The channel quality parameter represents quality of communication between two communications devices, and may specifically be a path loss level or a reference signal received power between the two communications devices; herein the channel quality parameter between the ready-to-support terminal and the base station needs to be obtained.

Specifically, the ready-to-support terminal receives a downlink pilot signal sent by the base station, and acquires the reference signal received power from the downlink pilot signal.

Alternatively, the ready-to-support terminal receives a downlink pilot signal and the system broadcast from the base station, acquires the reference signal received power from the downlink pilot signal, and acquires a transmit power of the base station from the system broadcast; and calculates a path loss level according to the reference signal received power and the transmit power of the base station.

A path loss value is equal to the transmit power minus the reference signal received power; or a more accurate path loss may be obtained when an antenna gain of the base station is obtained. In this case, a path loss value is equal to the transmit power of the base station minus the antenna gain of the base station and the reference signal received power.

The processor 701 is further configured to: when a determining result meets a first threshold, acquire a channel quality parameter between a benefited terminal and the ready-to-support terminal.

A predetermined threshold in the first threshold is set by the base station, and is sent by the base station to the ready-to-support terminal.

Alternatively, when a channel quality parameter between the benefited terminal and the base station changes slowly, the channel quality parameter between the benefited terminal and the base station is used as a predetermined threshold, to obtain the first threshold, and the first threshold is forwarded by the base station to the ready-to-support terminal.

Alternatively, the first threshold is stipulated in the text of a standard protocol: For example, a threshold of the channel quality between the supporting terminal and the base station is: a multiplied by a maximum transmit power of the base station, where a value of a is generally 0.8, 0.7, . . . , 0.4. In this way, the ready-to-support terminal may predetermine the threshold according to the standard protocol.

If the channel quality parameter between the ready-to-support terminal and the base station meets the first threshold, the cooperative communication continues to be established; or if the channel quality parameter between the ready-to-support terminal and the base station does not meet the first threshold, the ready-to-support terminal stops establishing the cooperative communication.

The processor 701 is further configured to: when the determining result meets a second threshold, generate, by the ready-to-support terminal, a measurement event, and send the measurement event to the base station by using the transmitter 703;

so that the base station sends a supporting-cooperation indication to the ready-to-support terminal according to the measurement event.

If the channel quality parameter between the ready-to-support terminal and the base station meets the second threshold, the cooperative communication continues to be established; or if the channel quality parameter between the ready-to-support terminal and the base station does not meet the second threshold, the ready-to-support terminal stops establishing the cooperative communication.

The measurement event includes: an ID of the measurement event, content of the measurement event, the channel quality parameter between the ready-to-support terminal and the base station, the channel quality parameter between the ready-to-support terminal and the benefited terminal, and an identifier of the benefited terminal. The content of the measurement event includes content of two determining events, which are respectively: the channel quality parameter between the ready-to-support terminal and the base station meets the first threshold, and the channel quality parameter between the ready-to-support terminal and the benefited terminal meets the second threshold.

When the second threshold is met, the ready-to-support terminal identifies itself as a candidate supporting terminal, generates a measurement event, and then initiates a radio connection to the base station, where the measurement event is reported, according to an LTE process, to the base station after the radio establishment; or reporting of the measurement event may be implemented in the following manner: a radio establishment request includes a bit that instructs the candidate supporting terminal to report the measurement event, and then the measurement event is reported in a reply to a subsequent query message of the base station; or the measurement event may be carried in a message that is in a radio establishment process.

Specifically, a process in which the ready-to-support terminal sends the measurement event to the base station is as follows:

After a measurement module of the ready-to-support terminal generates a measurement event D1, the measurement module sends an instruction to an RRC (Radio Resource Control, radio resource control) module, where the instruction is: initiate a request for establishing an RRC link, and the request message carries the measurement event D1 and a reason for establishing the RRC link. The reason for establishing the RRC link is: initiation by the ready-to-support terminal.

Alternatively, after a measurement module of the ready-to-support terminal generates a measurement event, the measurement module sends an instruction to an RRC module, where the instruction is: initiate a request for establishing an RRC link, and the request message carries a reason for establishing the RRC link. The reason for establishing the RRC link is: the ready-to-support terminal generates a D1 event. Subsequently, the measurement event D1 is reported in a reply to a subsequent query message of the base station.

Alternatively, an RRC module of the ready-to-support terminal generates a measurement event D1 by means of determining and comparison according to an underlying measurement result, and the generation of the measurement event D1 triggers the RRC module to generate a request message for establishing an RRC link, where the request message carries the measurement event D1 and a reason for establishing the RRC link. The reason for establishing the RRC link is: initiation by the ready-to-support terminal.

Alternatively, an RRC module of the ready-to-support terminal generates a measurement event D1 by means of determining and comparison according to an underlying measurement result, and the generation of the measurement event D1 triggers the RRC module to generate a request message for establishing an RRC link, where the request message carries a reason for establishing the RRC link. The reason for establishing the RRC link is: the ready-to-support terminal generates a D1 event. Subsequently, the measurement event D1 is reported in a reply to a subsequent query message of the base station.

The base station obtains the measurement event D1 and the reason for establishing the RRC link from the request for establishing the RRC link; or the base station obtains the reason for establishing the RRC link from the request for establishing the RRC link, and then acquires the measurement event D1 from the reply to the subsequent query message of the base station.

The processor 701 is further configured to receive, by using the receiver 702, the supporting-cooperation indication sent by the base station, and establish a cooperative communication set with the benefited terminal according to the supporting-cooperation indication, thereby becoming a supporting terminal.

Optionally, the receiver 702 is further configured to:
receive a beacon signal sent by the benefited terminal; and
the acquiring, by the processor 701, a channel quality parameter between a benefited terminal and the ready-to-support terminal specifically includes:
acquiring the channel quality parameter between the benefited terminal and the ready-to-support terminal by using the beacon signal.

The ready-to-support terminal that meets the first threshold may monitor a beacon signal by searching a discovery resource configuration of the base station, all frequency bands, or a resource that is exclusively used by the benefited terminal, and receive the beacon signal.

The channel quality parameter between the benefited terminal and the ready-to-support terminal is a path loss level or a reference signal received power. The ready-to-support terminal receives the beacon signal, and queries a beacon signal table for a channel quality parameter of the beacon signal.

The ready-to-support terminal may acquire the beacon signal table from a system broadcast of the base station, or the beacon signal carries the beacon signal table.

In the foregoing embodiment, the idle ready-to-support terminal receives a system broadcast sent by a base station, acquires a channel quality parameter between the ready-to-support terminal and the base station according to the system broadcast, and when the channel quality parameter between the ready-to-support terminal and the base station meets a first threshold, acquires a channel quality parameter between a benefited terminal and the ready-to-support terminal; and when the channel quality parameter between the benefited terminal and the ready-to-support terminal meets a second threshold, the ready-to-support terminal generates a measurement event, and sends the measurement event to the base station, so that the base station sends a supporting-cooperation indication to the ready-to-support terminal according to the measurement event; the ready-to-support terminal receives the supporting-cooperation indication sent by the base station, and establishes a cooperative communication set with the benefited terminal according to the supporting-cooperation indication. In this way, it is avoided that all ready-to-support terminals are connected to a base station to determine whether each ready-to-support terminal is capable of serving as a supporting terminal, thereby reducing power consumption. In addition, only a ready-to-support terminal that meets a preset condition sends a measurement event to the base station, and a ready-to-support terminal that does not meet the preset condition no longer initiates a process of establishing a connection to the base station, thereby reducing burden of the ready-to-support terminal and the base station.

Figure 8:
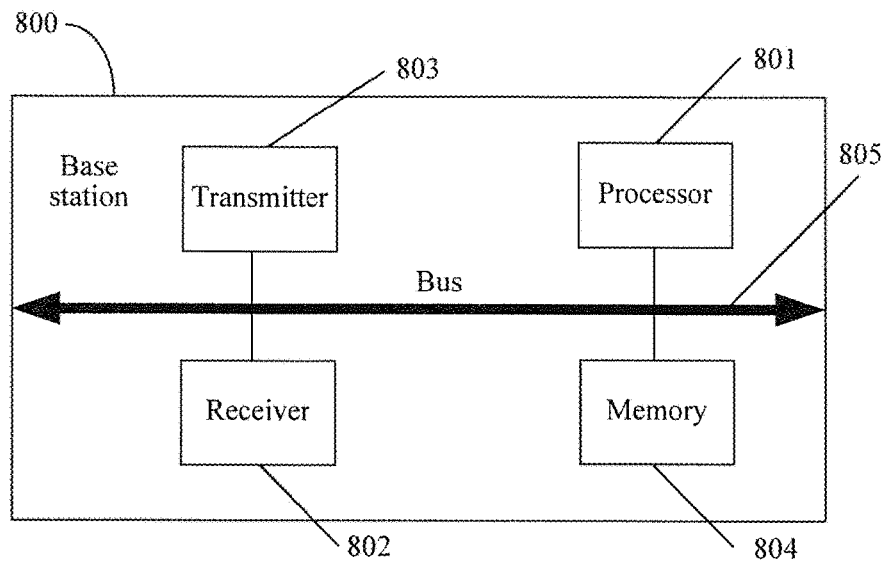
FIG. 8 is a schematic structural diagram of an apparatus for establishing cooperative communication according to another embodiment of the present invention.

An embodiment of the present invention provides a base station 800. Referring to FIG. 8, the base station 800 includes: a processor 801, a receiver 802, a transmitter 803, a memory 804, and a bus 805, where the processor 801, the receiver 802, the transmitter 803, and the memory 804 are connected to each other by using the bus 805, and the memory 804 is configured to store data processed by the processor;

the bus 805 may be an ISA (Industry Standard Architecture, Industry Standard Architecture) bus, a PCI (Peripheral Component, Peripheral Component Interconnect) bus, an EISA (Extended Industry Standard Architecture, Extended Industry Standard Architecture) bus, or the like; the bus 805 may be classified into an address bus, a data bus, a control bus, and the like; and is indicated by using only one bold line in FIG. 8 for the convenience of expression, which however does not indicate that there is only one bus or one type of bus, where:

the memory 804 is configured to store executable program code, and the program code includes a computer operation instruction; and the memory 804 may include a high-speed RAM memory, and may further include a non-volatile memory (non-volatile memory), for example, at least one magnetic disk memory.

The processor 801 may be a central processor (Central Processing Unit, CPU for short), or an application specific integrated circuit (Application Specific Integrated Circuit, ASIC for short), or configured as one or more integrated circuits that implement this embodiment of the present invention.

The transmitter 803 is configured to send a system broadcast to an idle ready-to-support terminal.

The system broadcast is used to notify the idle ready-to-support terminal to serve as a ready-to-support terminal, and instruct the ready-to-support terminal to acquire a channel quality parameter between the ready-to-support terminal and the base station.

The system broadcast includes at least one of an indicator bit and a first threshold, where
when the system broadcast includes only the indicator bit, the indicator bit instructs the idle ready-to-support terminal to serve as the ready-to-support terminal, and instructs the ready-to-support terminal to acquire the channel quality parameter between the ready-to-support terminal and the base station;
when the system broadcast includes only the first threshold, the idle ready-to-support terminal triggers a ready-to-support instruction according to the first threshold, and the idle ready-to-support terminal serves as the ready-to-support terminal according to the ready-to-support instruction, and acquires the channel quality parameter between the ready-to-support terminal and the base station; and
certainly, the system broadcast sent by the base station may also include both the indicator bit and the first threshold.

The receiver 802 is configured to receive a measurement event sent by the ready-to-support terminal device.

The processor 801 is configured to send, by using the transmitter, a supporting-cooperation indication to the ready-to-support terminal according to the measurement event received by the receiver 802, where the supporting-cooperation indication is used to notify the ready-to-support apparatus to establish a cooperative communication set with a benefited terminal.

The processor 801 is further configured to send, by using the transmitter, a benefited-cooperation indication to the benefited terminal according to the measurement event received by the receiver 802, where the benefited-cooperation indication is used to notify the benefited terminal to establish a cooperative communication set with the ready-to-support terminal.

Optionally, before the transmitter 803 sends the system broadcast to the idle ready-to-support terminal,
the processor 801 is further configured to perform transmission rate detection on all terminals, and select a benefited terminal from all the terminals according to a detection result; and
the transmitter 803 is further configured to send a beacon signal information table to the benefited terminal, so that the benefited terminal selects a beacon signal from the beacon signal information table, and sends the beacon signal to the ready-to-support terminal.

In the foregoing embodiment, the base station sends a system broadcast to an idle ready-to-support terminal, to notify the idle ready-to-support terminal to serve as a ready-to-support terminal for a benefited terminal, and instruct the ready-to-support terminal to acquire a channel quality parameter, and the ready-to-support terminal performs determining according to the channel quality parameter. If a condition is met, the ready-to-support terminal sends a measurement event to the base station, and the base station notifies, according to the measurement event, the ready-to-support terminal to establish a cooperative communication set with the benefited terminal. In this way, it is avoided that all ready-to-support terminals are connected to a base station to determine whether each ready-to-support terminal is capable of serving as a supporting terminal, thereby reducing power consumption. By means of a system broadcast, an idle ready-to-support terminal is notified to serve as a ready-to-support terminal for a benefited terminal, where the system broadcast can cover all terminals within an allowed range of a base station system, increasing a quantity of available ready-to-support terminals.

Figure 9:
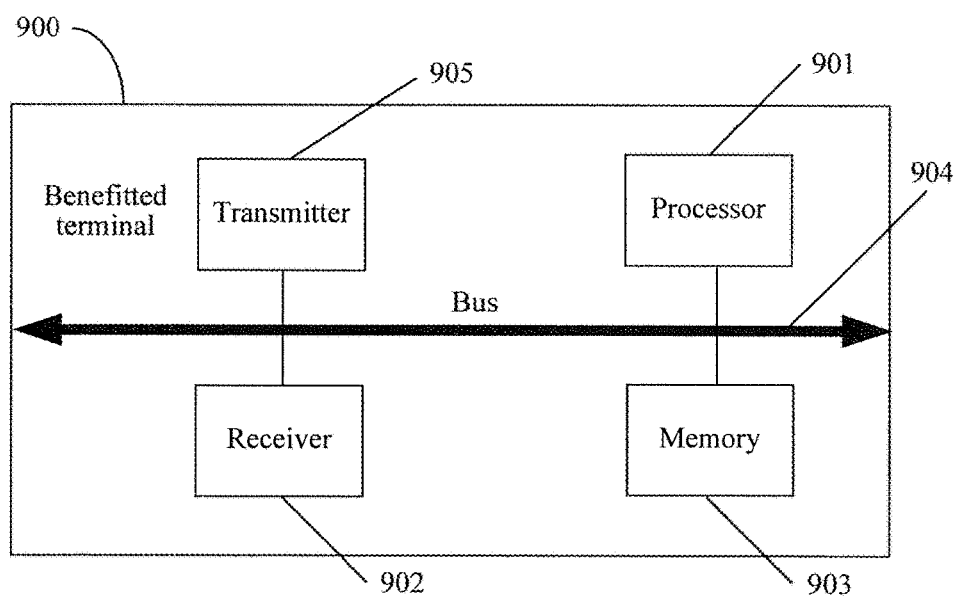
FIG. 9 is a schematic structural diagram of an apparatus for establishing cooperative communication according to still another embodiment of the present invention.

An embodiment of the present invention provides a benefited terminal 900. Referring to FIG. 9, the benefited terminal 900 includes: a processor 901, a receiver 902, a memory 903, and a bus 904, where the processor 901, the receiver 902, and the memory 903 are connected to each other by using the bus 904, and the memory 903 is configured to store data processed by the processor;

the bus 904 may be an ISA (Industry Standard Architecture, Industry Standard Architecture) bus, a PCI (Peripheral Component, Peripheral Component Interconnect) bus, an EISA (Extended Industry Standard Architecture, Extended Industry Standard Architecture) bus, or the like; the bus 904 may be classified into an address bus, a data bus, a control bus, and the like; and is indicated by using only one bold line in FIG. 9 for the convenience of expression, which however does not indicate that there is only one bus or one type of bus, where:

the memory 903 is configured to store executable program code, and the program code includes a computer operation instruction; and the memory 903 may include a high-speed RAM memory, and may further include a non-volatile memory (non-volatile memory), for example, at least one magnetic disk memory.

The processor 901 may be a central processor (Central Processing Unit, CPU for short), or an application specific integrated circuit (Application Specific Integrated Circuit, ASIC for short), or configured as one or more integrated circuits that implement this embodiment of the present invention.

The receiver 902 is configured to receive a beacon signal information table sent by a base station.

The beacon signal information table refers to a table of a correspondence between beacon signal sequence numbers and channel quality parameter levels. Each beacon signal has a corresponding sequence number, and channel quality parameters are classified into several levels according to values of the channel quality parameters. Each beacon signal corresponds to one channel quality level. The beacon signal information table is a table in which sequence numbers of beacon signals correspond to channel quality levels, where for the beacon signal information table, reference may be made to Table 2.

The beacon signal information table may also include a transmit power and a sending time of the beacon signal, and the benefited terminal sends the beacon signal to the ready-to-support terminal according to the transmit power and the sending time. When the beacon signal information table does not include the sending time, the benefited terminal constantly sends the beacon signal according to a cycle, where the base station may notify the benefited terminal of the sending cycle, or the benefited terminal may select the sending cycle. When the beacon signal information table does not include the transmit power, the benefited terminal may use a maximum transmit power of the benefited terminal, or the benefited terminal may use a transmit power at which the benefited terminal sends data to the base station, where a data length is a specific value (for example, a data block size TB size is 72 bits), and a modulation mode and an encoding rate are configured by the base station.

The processor 901 is configured to acquire a channel quality parameter between the benefited terminal and the base station.

The processor 901 is further configured to select a beacon signal from the beacon signal information table according to the channel quality parameter between the benefited terminal and the base station, and send, by using a transmitter 905, the beacon signal to the ready-to-support terminal, so that the ready-to-support terminal acquires a channel quality parameter between the benefited terminal and the ready-to-support terminal according to the beacon signal;

the receiver 902 is further configured to receive a benefited-cooperation indication sent by the base station; and the processor 901 is further configured to establish a cooperative communication set with the ready-to-support terminal according to the benefited-cooperation indication.

In the foregoing embodiment, the benefited terminal sends a beacon signal to a ready-to-support terminal by using a beacon signal information table, so that the ready-to-support terminal acquires a channel quality parameter between the benefited terminal and the ready-to-support terminal. It is avoided that all ready-to-support terminals are connected to a base station to detect channel quality between each ready-to-support terminal and the base station, thereby reducing power consumption of the ready-to-support terminal.

Figure 10:
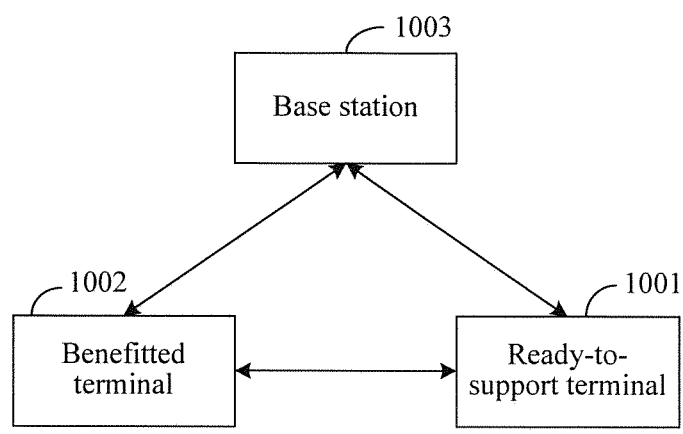
FIG. 10 is a schematic structural diagram of a system for establishing cooperative communication according to an embodiment of the present invention.

An embodiment of the present invention provides a communications system 11. Referring to FIG. 10, the communications system 11 includes:

at least one ready-to-support terminal 1001, at least one benefited terminal 1002, and a base station 1003, where all terminals are connected to and communicate with the base station 1003.

The ready-to-support terminal 1001 is the ready-to-support terminal 400 or the ready-to-support terminal 700 in the embodiments of the present invention; the benefited terminal 1002 is the benefited terminal 600 or the benefited terminal 900 in the embodiments of the present invention; the base station 1003 is the base station 500 or the base station 800 in the embodiments of the present invention. A method for establishing cooperative communication by the system is already specifically described in the embodiments of the present invention. Details are not described herein again.

In the foregoing communications system, the base station sends a system broadcast to an idle ready-to-support terminal, to notify the idle ready-to-support terminal to serve as a ready-to-support terminal, and instruct the ready-to-support terminal to acquire a channel quality parameter between the ready-to-support terminal and the base station, and the ready-to-support terminal performs determining according to the channel quality parameter between the ready-to-support terminal and the base station. If a condition is met, the ready-to-support terminal further determines a channel quality parameter between the ready-to-support terminal and the benefited terminal. If a condition is met, the ready-to-support terminal sends a measurement event to the base station, and the base station notifies, according to the measurement event, the ready-to-support terminal to establish a cooperative communication set with the benefited terminal. In this way, it is avoided that all ready-to-support terminals are connected to a base station to determine whether each ready-to-support terminal can serve as a supporting terminal, thereby reducing power consumption.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for establishing cooperative communication for use with a ready-to-support terminal in an idle state, the method comprising:
    receiving a system broadcast sent by a base station;
    acquiring a channel quality parameter of communications between the ready-to-support terminal and the base station according to the system broadcast;
    when a value of the channel quality parameter of communications between the ready-to-support terminal and the base station meets a first threshold, acquiring a channel quality parameter of communications between a benefited terminal and the ready-to-support terminal;
    when a value of the channel quality parameter of communications between the ready-to-support terminal and the benefited terminal meets a second threshold, generating, by the ready-to-support terminal, a measurement event, and sending the measurement event to the base station, wherein the measurement event includes at least the channel quality parameter of communications between the ready-to-support terminal and the base station and the channel quality parameter of communications between the ready-to-support terminal and the benefited terminal; and
    after sending the measurement event to the base station, receiving the supporting-cooperation indication sent by the base station, and establishing a cooperative communication set with the benefited terminal according to the supporting-cooperation indication.

2. The method according to claim 1, further comprising:
    receiving, by the ready-to-support terminal, a beacon signal sent by the benefited terminal; and
    wherein acquiring a channel quality parameter of communications between a benefited terminal and the ready-to-support terminal specifically comprises:
        acquiring the channel quality parameter of communications between the benefited terminal and the ready-to-support terminal by using the beacon signal.

3. The method for establishing cooperative communication according to claim 1, wherein the measurement event also comprises: an identity ID of the measurement event, content of the measurement event, and an identifier of the benefited terminal.

4. The method for establishing cooperative communication according to claim 3, wherein the content of the measurement event comprises:
    the value of the channel quality parameter of communications between the ready-to-support terminal and the base station meets the first threshold; and
    the value of the channel quality parameter of communications between the ready-to-support terminal and the benefited terminal meets the second threshold.

5. A method for establishing cooperative communication for use with a base station, the method comprising:
    sending, by the base station, a system broadcast to an idle ready-to-support terminal for enabling the idle ready-to-support terminal to serve as a ready-to-support terminal according to the system broadcast, and for enabling the ready-to-support terminal to acquire a channel quality parameter of communications between the ready-to-support terminal and the base station;
    receiving, by the base station, a measurement event sent by the ready-to-support terminal, wherein the measurement event includes at least a channel quality parameter of communications between the ready-to-support terminal and the base station and a channel quality parameter of communications between the ready-to-support terminal and a benefited terminal;
    sending, by the base station, a supporting-cooperation indication to the ready-to-support terminal according to the measurement event for instructing the ready-to-support terminal to establish a cooperative communication set with the benefited terminal; and
    sending, by the base station, a benefited-cooperation indication to the benefited terminal according to the measurement event for notifying the benefited terminal to establish a cooperative communication set with the ready-to-support terminal.

6. The method for establishing cooperative communication according to claim 5, wherein the measurement event also comprises: an identity ID of the measurement event, content of the measurement event, and an identifier of the benefited terminal.

7. The method according to claim 5, wherein the system broadcast comprises at least one of the following:
    an indicator bit for instructing the idle ready-to-support terminal to serve as the ready-to-support terminal, and for instructing the ready-to-support terminal to acquire the channel quality parameter of communications between the ready-to-support terminal and the base station.

8. A method for establishing cooperative communication for use with a benefited terminal, the method comprising:
    receiving, by the benefited terminal, a beacon signal information table sent by a base station;
    acquiring, by the benefited terminal, a channel quality parameter of communications between the benefited terminal and the base station;
    selecting a beacon signal from the beacon signal information table according to the channel quality parameter of communications between the benefited terminal and the base station, and sending the beacon signal to a ready-to-support terminal for instructing the ready-to-support terminal to acquire a channel quality parameter of communications between the benefited terminal and the ready-to-support terminal according to the beacon signal;
    receiving, by the benefited terminal, a benefited-cooperation indication sent by the base station; and establishing a cooperative communication set with the ready-to-support terminal according to the benefited-cooperation indication.

9. A ready-to-support terminal, comprising:
a processor, a receiver, a transmitter, a memory, and a bus, wherein the processor, the receiver, the transmitter, and the memory are connected to each other by using the bus, and the memory is configured to store data processed by the processor;
wherein the receiver is configured to:
when the ready-to-support terminal is in an idle state, receive a system broadcast sent by a base station; and
wherein the processor is configured to:
acquire a channel quality parameter of communications between the supporting terminal and the base station according to the system broadcast received by the receiver,
when a value of the channel quality parameter of communications between the ready-to-support terminal and the base station meets a first threshold, acquire a channel quality parameter of communications between a benefited terminal and the ready-to-support terminal,
when a value of the channel quality parameter of communications between the ready-to-support terminal and the benefited terminal meets a second threshold, generate, a measurement event, and send the measurement event to the base station by using the transmitter, wherein the measurement event includes at least the channel quality parameter of communications between the ready-to-support terminal and the base station and the channel quality parameter of communications between the ready-to-support terminal and the benefited terminal, and
receive, by using the receiver, the supporting-cooperation indication sent by the base station, and establish a cooperative communication set with the benefited terminal according to the supporting-cooperation indication, thereby becoming a supporting terminal.

10. The ready-to-support terminal according to claim 9, wherein:
the receiver is further configured to:
receive a beacon signal sent by the benefited terminal; and
the processor is further configured to:
acquire the channel quality parameter of communications between the benefited terminal and the ready-to-support terminal by using the beacon signal.

11. The ready-to-support terminal according to claim 9, wherein the measurement event sent by the transmitter also comprises: an identity ID of the measurement event, content of the measurement event, and an identifier of the benefited terminal.

12. The ready-to-support terminal according to claim 11, wherein the content of the measurement event in the measurement event sent by the transmitter comprises:
the value of the channel quality parameter of communications between the ready-to-support terminal and the base station meets the first threshold; and
the value of the channel quality parameter of communications between the ready-to-support terminal and the benefited terminal meets the second threshold.

13. A base station, comprising:
a processor, a receiver, a transmitter, a memory, and a bus, wherein the processor, the receiver, the transmitter, and the memory are connected to each other by using the bus, and the memory is configured to store data processed by the processor;
wherein the transmitter is configured to:
send a system broadcast to an idle ready-to-support terminal, for enabling the idle ready-to-support terminal to serve as a ready-to-support terminal according to the system broadcast, and for enabling the ready-to-support terminal to acquire a channel quality parameter of communications between the ready-to-support terminal and the base station;
wherein the receiver is configured to:
receive a measurement event sent by the ready-to-support terminal, wherein the measurement event includes at least the channel quality parameter of communications between the ready-to-support terminal and the base station and a channel quality parameter of communications between the ready-to-support terminal and a benefited terminal; and
wherein the processor is configured to:
send, by using the transmitter, a supporting-cooperation indication to the ready-to-support terminal according to the measurement event received by the receiver, wherein the supporting-cooperation indication is used to notify the ready-to-support terminal to establish a cooperative communication set with the benefited terminal, and
send, by using the transmitter, a benefited-cooperation indication to the benefited terminal according to the measurement event received by the receiver, wherein the benefited-cooperation indication is used to notify the benefited terminal to establish a cooperative communication set with the ready-to-support terminal.

14. The base station according to claim 13, wherein:
before the transmitter sends the system broadcast to the idle ready-to-support terminal, the processor is further configured to:
perform transmission rate detection on all terminals, and select a benefited terminal from all the terminals according to a detection result; and
the transmitter is further configured to:
send a beacon signal information table to the benefited terminal, so that the benefited terminal selects a beacon signal from the beacon signal information table, and sends the beacon signal to the ready-to-support terminal.

15. The base station according to claim 13, wherein the measurement event received by the receiver also comprises: an identity ID of the measurement event, content of the measurement event, and an identifier of the benefited terminal.

16. The base station according to claim 15, wherein the identifier of the benefited terminal in the measurement event received by the receiver comprises at least one of the following:
an identifier of a beacon signal between the benefited terminal and the ready-to-support terminal, a device to device code D2Dcode, and an identity ID of a frequency band.

17. The base station according to claim 13, wherein the system broadcast comprises at least one of:
an indicator bit that is is used to instruct the idle ready-to-support terminal to serve as the ready-to-support terminal, and instruct the ready-to-support terminal to acquire the channel quality parameter of communications between the ready-to-support terminal and the base station.

18. A benefited terminal, comprising:

a processor, a receiver, a memory, and a bus, wherein the processor, the receiver, and the memory are connected to each other by using the bus, and the memory is configured to store data processed by the processor;

wherein the receiver is configured to:
- receive a beacon signal information table sent by a base station, and
- receive a benefited-cooperation indication sent by the base station; and wherein the processor is configured to:
- acquire a channel quality parameter of communications between the benefited terminal and the base station,
- select a beacon signal from the beacon signal information table according to the channel quality parameter of communications between the benefited terminal and the base station, and send, by using a transmitter, the beacon signal to the ready-to-support terminal, for enabling the ready-to-support terminal acquires a channel quality parameter of communications between the benefited terminal and the ready-to-support terminal according to the beacon signal, and
- establish a cooperative communication set with the ready-to-support terminal according to the benefited-cooperation indication.

* * * * *